(12) United States Patent
Perucca et al.

(10) Patent No.: US 7,866,716 B2
(45) Date of Patent: Jan. 11, 2011

(54) ENERGY ABSORBER FOR VEHICLE

(75) Inventors: Steven R. Perucca, Clinton Township, MI (US); Jeffery S. Cherniausky, Oxford, MI (US)

(73) Assignee: Flex-N-Gate Corporation, Urbana, IL (US)

( * ) Notice: Subject to any disclaimer, the term of this patent is extended or adjusted under 35 U.S.C. 154(b) by 1 day.

(21) Appl. No.: 12/419,904

(22) Filed: Apr. 7, 2009

(65) Prior Publication Data

US 2009/0250953 A1    Oct. 8, 2009

Related U.S. Application Data

(60) Provisional application No. 61/043,331, filed on Apr. 8, 2008.

(51) Int. Cl.
 *B60N 99/00* (2006.01)
(52) U.S. Cl. ............... 293/133; 293/102; 293/120
(58) Field of Classification Search ........... 296/187.03, 296/39.1, 187.05, 187.04, 187.09, 187.11, 296/187.12; 293/120, 102, 133; 280/751; 188/371
See application file for complete search history.

(56) References Cited

U.S. PATENT DOCUMENTS

| | | | |
|---|---|---|---|
| 3,727,870 A | 4/1973 | Bass | |
| 3,871,636 A | 3/1975 | Boyle | |
| 4,072,334 A | 2/1978 | Seegmiller et al. | |
| 4,105,236 A | 8/1978 | Haar | |
| 4,366,885 A | 1/1983 | Vrijburg | |
| 4,597,601 A | 7/1986 | Manning | |
| 4,715,645 A | 12/1987 | Lewis et al. | |
| 4,753,467 A | 6/1988 | DeCaluwe et al. | |
| 4,770,453 A | 9/1988 | Reynolds | |
| 4,778,208 A | 10/1988 | Lehr et al. | |
| 4,826,226 A | 5/1989 | Klie et al. | |
| 4,829,979 A | 5/1989 | Moir | |
| 4,830,417 A | 5/1989 | Bates et al. | |
| 4,856,833 A | 8/1989 | Beekman | |
| 4,877,279 A | 10/1989 | Logan | |
| 4,893,857 A | 1/1990 | Bobinger et al. | |

(Continued)

FOREIGN PATENT DOCUMENTS

DE    4119640 A    2/1995

(Continued)

*Primary Examiner*—Lori L Lyjak
(74) *Attorney, Agent, or Firm*—Pepper Hamilton LLP

(57) ABSTRACT

An energy absorber for a vehicle bumper system includes a plurality of crush boxes that are configured to absorb impact energy. Each of the plurality of crush boxes are generally hollow and have a front wall and a plurality of side walls integrally formed with and extending from the front wall to a rear of the energy absorber. A first crush box is separated from a second crush box by a distance such that an open space is defined between a side wall of the first crush box and a side wall of the second crush box. At least one rib extends between the side wall of the first crush box and the side wall of the second crush box in the open space to couple the first crush box to the second crush box. The at least one rib is integrally formed with the first crush box and the second crush box, and extends at least partially between the rear of the energy absorber and the front walls of the first and second crush boxes.

22 Claims, 13 Drawing Sheets

U.S. PATENT DOCUMENTS

| | | | |
|---|---|---|---|
| 4,925,224 A | 5/1990 | Smiszek |
| 4,929,008 A | 5/1990 | Esfandiary |
| 4,940,270 A | 7/1990 | Yamazaki et al. |
| 4,961,603 A | 10/1990 | Carpenter |
| 4,968,076 A | 11/1990 | Kuroki |
| 4,971,376 A | 11/1990 | Eipper et al. |
| 4,974,891 A | 12/1990 | Furuta |
| 4,976,481 A | 12/1990 | Yoshihra |
| 4,998,761 A | 3/1991 | Bayer et al. |
| 5,005,887 A | 4/1991 | Kelman |
| 5,011,205 A | 4/1991 | Liu |
| 5,029,919 A | 7/1991 | Bauer |
| 5,031,947 A | 7/1991 | Chen |
| 5,056,840 A | 10/1991 | Eipper et al. |
| 5,067,759 A | 11/1991 | Fleming |
| 5,078,439 A | 1/1992 | Terada et al. |
| 5,080,410 A | 1/1992 | Stewart et al. |
| 5,080,411 A | 1/1992 | Stewart et al. |
| 5,080,412 A | 1/1992 | Stewart et al. |
| 5,080,427 A | 1/1992 | Sturrus et al. |
| 5,090,755 A | 2/1992 | Garnweidner |
| 5,092,512 A | 3/1992 | Sturrus et al. |
| 5,096,243 A | 3/1992 | Gembinski |
| 5,100,189 A | 3/1992 | Futamata et al. |
| 5,104,026 A | 4/1992 | Sturrus et al. |
| 5,106,137 A | 4/1992 | Curtis |
| 5,116,092 A | 5/1992 | Schonleber |
| 5,150,935 A | 9/1992 | Glance et al. |
| 5,172,948 A | 12/1992 | Garnweidner |
| 5,219,197 A | 6/1993 | Rich et al. |
| 5,265,925 A | 11/1993 | Cox et al. |
| 5,273,330 A | 12/1993 | Petry et al. |
| 5,277,462 A | 1/1994 | Verzelli et al. |
| 5,290,078 A | 3/1994 | Bayer et al. |
| 5,305,625 A | 4/1994 | Heinz |
| 5,306,058 A | 4/1994 | Sturrus et al. |
| 5,339,933 A | 8/1994 | Bauer et al. |
| 5,340,177 A | 8/1994 | Maxam et al. |
| 5,340,178 A | 8/1994 | Stewart et al. |
| 5,358,294 A | 10/1994 | Palmer |
| 5,393,111 A | 2/1995 | Eipper et al. |
| 5,395,036 A | 3/1995 | Sturrus |
| 5,403,049 A | 4/1995 | Ebbinghaus |
| 5,407,239 A | 4/1995 | Arai et al. |
| 5,425,561 A | 6/1995 | Morgan |
| 5,427,214 A | 6/1995 | Prottengeier et al. |
| 5,431,463 A | 7/1995 | Chou |
| 5,431,464 A | 7/1995 | Jones et al. |
| 5,441,319 A | 8/1995 | Oyama et al. |
| 5,454,504 A | 10/1995 | Sturrus |
| 5,462,144 A | 10/1995 | Guardiola et al. |
| 5,468,033 A | 11/1995 | Dohrmann et al. |
| 5,482,336 A | 1/1996 | Rouse et al. |
| 5,492,207 A | 2/1996 | Clausen |
| 5,498,044 A | 3/1996 | Bovellan et al. |
| 5,498,045 A | 3/1996 | Morgan et al. |
| 5,507,540 A | 4/1996 | Pernot |
| 5,545,022 A | 8/1996 | Rosasco |
| 5,545,361 A | 8/1996 | Rosasco |
| 5,566,874 A | 10/1996 | Sturrus |
| 5,577,784 A | 11/1996 | Nelson |
| 5,625,991 A | 5/1997 | Sturrus |
| 5,626,376 A | 5/1997 | Parker |
| 5,658,027 A | 8/1997 | Eissinger et al. |
| 5,688,006 A | 11/1997 | Bladow et al. |
| 5,711,562 A | 1/1998 | Terada et al. |
| 5,725,266 A | 3/1998 | Anderson et al. |
| 5,725,267 A | 3/1998 | Grosser et al. |
| 5,727,826 A | 3/1998 | Frank et al. |
| 5,732,801 A | 3/1998 | Gertz |
| 5,746,419 A | 5/1998 | McFadden et al. |
| 5,772,267 A | 6/1998 | Heim et al. |
| 5,785,367 A | 7/1998 | Baumann et al. |
| 5,785,368 A | 7/1998 | Hartman et al. |
| 5,788,297 A | 8/1998 | Sugawara et al. |
| 5,799,991 A | 9/1998 | Glance |
| 5,803,514 A | 9/1998 | Shibuya et al. |
| 5,803,517 A | 9/1998 | Shibuya |
| 5,813,594 A | 9/1998 | Sturrus |
| 5,829,805 A | 11/1998 | Watson |
| 5,845,948 A | 12/1998 | Anderson et al. |
| 5,876,078 A | 3/1999 | Miskech et al. |
| 5,927,778 A | 7/1999 | Uytterhaeghe et al. |
| 5,932,165 A | 8/1999 | Corbett et al. |
| 5,934,743 A | 8/1999 | Nohr et al. |
| 5,941,582 A | 8/1999 | Tan |
| 5,947,538 A | 9/1999 | White |
| 5,967,573 A | 10/1999 | Wang |
| 5,967,592 A | 10/1999 | Freeman |
| 5,971,451 A | 10/1999 | Huang |
| 5,984,389 A | 11/1999 | Nuber et al. |
| 5,984,390 A | 11/1999 | Kemp et al. |
| 6,000,738 A | 12/1999 | Stewart et al. |
| 6,003,912 A | 12/1999 | Schonhoff et al. |
| 6,003,930 A | 12/1999 | Frank et al. |
| 6,007,123 A | 12/1999 | Schwartz et al. |
| 6,010,169 A | 1/2000 | Cox et al. |
| 6,042,163 A | 3/2000 | Reiffer |
| 6,053,664 A | 4/2000 | Crane et al. |
| 6,059,331 A | 5/2000 | Mori |
| 6,062,634 A | 5/2000 | Aloe et al. |
| 6,065,786 A | 5/2000 | Wheatley |
| 6,082,792 A | 7/2000 | Evans et al. |
| 6,085,878 A | 7/2000 | Araki et al. |
| 6,089,628 A | 7/2000 | Schuster |
| 6,106,039 A | 8/2000 | Maki |
| 6,129,384 A | 10/2000 | Fischer et al. |
| 6,135,251 A | 10/2000 | Hartlieb et al. |
| 6,148,970 A | 11/2000 | Akad |
| 6,174,008 B1 | 1/2001 | Kramer et al. |
| 6,174,009 B1 | 1/2001 | McKeon |
| 6,179,353 B1 | 1/2001 | Heatherington et al. |
| 6,179,355 B1 | 1/2001 | Chou et al. |
| 6,179,356 B1 | 1/2001 | Hartlieb et al. |
| 6,199,924 B1 | 3/2001 | Oguri et al. |
| 6,199,937 B1 | 3/2001 | Zetouna et al. |
| 6,199,942 B1 | 3/2001 | Carroll et al. |
| 6,209,934 B1 | 4/2001 | Sakuma et al. |
| 6,217,090 B1 | 4/2001 | Berzinji |
| 6,227,583 B1 | 5/2001 | Eipper et al. |
| 6,231,095 B1 | 5/2001 | Chou et al. |
| 6,240,820 B1 | 6/2001 | Sturrus et al. |
| 6,244,625 B1 | 6/2001 | Bayer et al. |
| 6,247,745 B1 | 6/2001 | Carroll et al. |
| 6,250,711 B1 | 6/2001 | Takahara |
| 6,254,161 B1 | 7/2001 | Wochaski |
| 6,270,131 B1 | 8/2001 | Martinez et al. |
| 6,279,973 B1 | 8/2001 | Albertini et al. |
| 6,283,677 B1 | 9/2001 | Slattery et al. |
| 6,290,272 B1 | 9/2001 | Braun |
| 6,299,226 B1 | 10/2001 | Kroning et al. |
| 6,299,227 B1 | 10/2001 | Kroning et al. |
| 6,308,999 B1 | 10/2001 | Tan et al. |
| 6,312,028 B1 | 11/2001 | Wilkosz |
| 6,315,339 B1 | 11/2001 | Devilliers et al. |
| 6,318,775 B1 | 11/2001 | Heatherington et al. |
| 6,325,431 B1 | 12/2001 | Ito |
| 6,334,518 B1 | 1/2002 | Garnweidner et al. |
| 6,334,638 B1 | 1/2002 | Yamamuro et al. |
| 6,334,639 B1 | 1/2002 | Vives et al. |
| 6,338,510 B1 | 1/2002 | Kanamori et al. |
| 6,343,820 B1 | 2/2002 | Pedersen |
| 6,343,821 B2 | 2/2002 | Breed |
| 6,345,425 B1 | 2/2002 | Rosasco et al. |

| | | | | | | |
|---|---|---|---|---|---|---|
| 6,349,521 | B1 | 2/2002 | McKeon et al. | 6,695,368 | B1 | 2/2004 | Weykamp |
| 6,357,816 | B1 | 3/2002 | Porter | 6,698,808 | B2 | 3/2004 | Burkhardt et al. |
| 6,361,092 | B1 | 3/2002 | Eagle et al. | 6,698,809 | B2 | 3/2004 | Stol et al. |
| 6,371,540 | B1 | 4/2002 | Campanella et al. | 6,698,820 | B2 | 3/2004 | Nakata |
| 6,371,541 | B1 | 4/2002 | Pedersen | 6,702,345 | B1 | 3/2004 | Yoshida |
| 6,394,512 | B1 | 5/2002 | Schuster et al. | 6,702,346 | B2 | 3/2004 | Wikstrom |
| 6,398,275 | B1 | 6/2002 | Hartel et al. | 6,705,653 | B2 | 3/2004 | Gotanda et al. |
| 6,406,077 | B2 | 6/2002 | Johnson | 6,709,036 | B1 | 3/2004 | Evans |
| 6,406,081 | B2 | 6/2002 | Mahfet et al. | 6,709,044 | B2 | 3/2004 | Frank |
| 6,409,239 | B1 | 6/2002 | Tjoelker et al. | 6,712,410 | B2 | 3/2004 | Kudelko et al. |
| 6,412,836 | B1 | 7/2002 | Mansoor et al. | 6,712,411 | B2 | 3/2004 | Gotanda et al. |
| 6,416,094 | B1 | 7/2002 | Cherry | 6,722,037 | B2 | 4/2004 | Nees et al. |
| 6,428,064 | B1 | 8/2002 | Frederick | 6,726,258 | B1 | 4/2004 | Sundgren et al. |
| 6,428,086 | B2 | 8/2002 | Takahara | 6,726,261 | B2 | 4/2004 | Goto et al. |
| 6,435,578 | B1 | 8/2002 | Li | 6,726,262 | B2 | 4/2004 | Marijnissen et al. |
| 6,435,601 | B2 | 8/2002 | Takahara | 6,730,386 | B1 | 5/2004 | Stahlke et al. |
| 6,439,650 | B2 | 8/2002 | Artner et al. | 6,733,055 | B2 | 5/2004 | Iino |
| 6,443,511 | B2 | 9/2002 | Braun | 6,736,434 | B2 | 5/2004 | Anderson et al. |
| 6,443,512 | B1 | 9/2002 | Van Ress et al. | 6,736,449 | B2 | 5/2004 | Takahashi et al. |
| 6,443,513 | B1 | 9/2002 | Glance | 6,742,234 | B2 | 6/2004 | Rosasco et al. |
| 6,460,667 | B1 | 10/2002 | Bruck et al. | 6,746,061 | B1 | 6/2004 | Evans |
| 6,460,909 | B2 | 10/2002 | Mansoor et al. | 6,755,452 | B2 | 6/2004 | Cate et al. |
| 6,467,821 | B2 | 10/2002 | Hirota | 6,755,459 | B2 | 6/2004 | Thelen et al. |
| 6,467,822 | B1 | 10/2002 | Leng | 6,758,506 | B2 | 7/2004 | Malteste et al. |
| 6,467,831 | B1 | 10/2002 | Mori et al. | 6,758,507 | B2 | 7/2004 | Tarahomi et al. |
| 6,474,709 | B2 | 11/2002 | Artner | 6,764,099 | B2 | 7/2004 | Akiyama et al. |
| 6,481,690 | B2 | 11/2002 | Kariatsummari et al. | 6,764,117 | B2 | 7/2004 | Jonsson |
| 6,484,386 | B2 | 11/2002 | Tuin et al. | 6,764,118 | B2 | 7/2004 | DePottey et al. |
| 6,485,072 | B1 | 11/2002 | Werner et al. | 6,764,119 | B2 | 7/2004 | Bladow et al. |
| 6,494,510 | B2 | 12/2002 | Okamura et al. | 6,767,039 | B2 | 7/2004 | Bird |
| 6,502,874 | B2 | 1/2003 | Kajiwara et al. | 6,767,502 | B2 | 7/2004 | Porter |
| 6,510,771 | B2 | 1/2003 | Sturrus et al. | 6,773,044 | B2 | 8/2004 | Schambre et al. |
| 6,520,552 | B2 | 2/2003 | Schroter et al. | 6,779,821 | B2 | 8/2004 | Hallergren |
| 6,536,818 | B1 | 3/2003 | Moss | 6,786,520 | B2 | 9/2004 | Burkhardt et al. |
| 6,540,275 | B1 | 4/2003 | Iwamoto et al. | 6,793,256 | B2 | 9/2004 | Carley et al. |
| 6,540,276 | B2 | 4/2003 | Azuchi et al. | 6,808,215 | B2 | 10/2004 | Sakuma et al. |
| 6,547,295 | B2 | 4/2003 | Vismara | 6,814,379 | B2 | 11/2004 | Evans |
| 6,547,316 | B2 | 4/2003 | Chung | 6,814,380 | B2 | 11/2004 | Yoshida et al. |
| 6,554,333 | B2 | 4/2003 | Shimotsu et al. | 6,814,381 | B1 | 11/2004 | Frank |
| 6,554,341 | B2 | 4/2003 | Lee | 6,830,286 | B2 | 12/2004 | Bechtold et al. |
| 6,568,891 | B2 | 5/2003 | DeLong | 6,832,795 | B2 | 12/2004 | Bastien et al. |
| 6,575,510 | B2 | 6/2003 | Weissenborn | 6,836,717 | B2 | 12/2004 | Bucchele et al. |
| 6,588,830 | B1 | 7/2003 | Schmidt et al. | 6,846,026 | B2 | 1/2005 | Detwiler et al. |
| 6,595,502 | B2 | 7/2003 | Koch et al. | 6,848,730 | B2 | 2/2005 | Evans |
| 6,609,740 | B2 | 8/2003 | Evans | 6,851,731 | B2 | 2/2005 | Janssen |
| 6,622,450 | B2 | 9/2003 | Nees et al. | 6,857,690 | B2 | 2/2005 | Vismara et al. |
| 6,623,054 | B1 | 9/2003 | Palmquist | 6,863,322 | B2 | 3/2005 | Hunter et al. |
| 6,623,055 | B2 | 9/2003 | Knaup et al. | 6,866,313 | B2 | 3/2005 | Mooijman et al. |
| 6,634,702 | B1 | 10/2003 | Pleschke et al. | 6,871,889 | B2 | 3/2005 | Ericsson |
| 6,637,786 | B2 | 10/2003 | Yamagiwa | 6,874,831 | B1 | 4/2005 | Pouget et al. |
| 6,637,788 | B1 | 10/2003 | Zollner et al. | 6,874,832 | B2 | 4/2005 | Evans et al. |
| 6,637,790 | B2 | 10/2003 | Bio | 6,877,785 | B2 | 4/2005 | Evans et al. |
| 6,643,931 | B2 | 11/2003 | Nees | 6,866,333 | B2 | 5/2005 | Saitou |
| 6,644,699 | B2 | 11/2003 | Anderson et al. | 6,886,872 | B2 | 5/2005 | Matsumoto et al. |
| 6,644,701 | B2 | 11/2003 | Weissenborn et al. | 6,886,873 | B2 | 5/2005 | Weykamp et al. |
| 6,648,383 | B2 | 11/2003 | Vismara et al. | 6,890,011 | B2 | 5/2005 | Arvelo et al. |
| 6,648,384 | B2 | 11/2003 | Nees et al. | 6,893,062 | B2 | 5/2005 | Amano et al. |
| 6,648,385 | B2 | 11/2003 | Frank | 6,893,063 | B2 | 5/2005 | Harrison et al. |
| 6,655,509 | B2 | 12/2003 | Dohrmann et al. | 6,893,064 | B2 | 5/2005 | Satou |
| 6,655,721 | B2 | 12/2003 | Hagen | 6,899,195 | B2 | 5/2005 | Miyasaka |
| 6,659,518 | B2 | 12/2003 | Ponsonnaille et al. | 6,902,215 | B1 | 6/2005 | Condeelis |
| 6,659,520 | B2 | 12/2003 | Bastien et al. | 6,908,127 | B2 | 6/2005 | Evans |
| 6,659,535 | B2 | 12/2003 | Dohrmann | 6,908,129 | B2 | 6/2005 | Shimotsu |
| 6,663,150 | B1 | 12/2003 | Evans | 6,908,130 | B2 | 6/2005 | Reutlinger et al. |
| 6,663,151 | B2 | 12/2003 | Mansoor et al. | 6,918,621 | B2 | 7/2005 | Seksaria |
| 6,669,179 | B2 | 12/2003 | Dohrmann | 6,923,483 | B2 | 8/2005 | Curry et al. |
| 6,669,251 | B2 | 12/2003 | Trappe | 6,923,494 | B2 | 8/2005 | Shuler et al. |
| 6,672,635 | B2 | 1/2004 | Weisenborn et al. | 6,926,321 | B2 | 8/2005 | Zipfel |
| 6,679,967 | B1 | 1/2004 | Carroll et al. | 6,926,323 | B2 | 8/2005 | Evans |
| 6,682,804 | B2 | 1/2004 | Orndorff | 6,926,325 | B2 | 8/2005 | Frank |
| 6,684,505 | B2 | 2/2004 | Sundgren et al. | 6,929,296 | B2 | 8/2005 | Yang |
| 6,685,243 | B1 | 2/2004 | Evans | 6,932,201 | B2 | 8/2005 | Akiyama et al. |
| 6,695,366 | B2 | 2/2004 | Cherry | 6,932,398 | B2 | 8/2005 | Frank |

| | | | | | |
|---|---|---|---|---|---|
| 6,938,936 B2 | 9/2005 | Mooijman et al. | 7,210,717 B1 | 5/2007 | Baccouche et al. |
| 6,938,948 B1 | 9/2005 | Cornell et al. | 7,210,719 B2 | 5/2007 | Honda et al. |
| 6,942,262 B2 | 9/2005 | Glasgow et al. | 7,213,436 B2 | 5/2007 | Sturrus et al. |
| 6,945,576 B1 | 9/2005 | Arentzen | 7,213,867 B2 | 5/2007 | Haneda et al. |
| 6,949,209 B2 | 9/2005 | Zander et al. | 7,222,896 B2 | 5/2007 | Evans |
| 6,957,846 B2 | 10/2005 | Saeki | 7,222,897 B2 | 5/2007 | Evans et al. |
| 6,959,950 B2 | 11/2005 | Bladow et al. | 7,226,097 B2 | 6/2007 | Adachi et al. |
| 6,962,245 B2 | 11/2005 | Ray et al. | 7,228,723 B2 | 6/2007 | Evans et al. |
| 6,962,379 B2 | 11/2005 | Minami et al. | 7,234,741 B1 | 6/2007 | Reynolds et al. |
| 6,971,690 B2 | 12/2005 | Evans et al. | 7,240,932 B2 | 7/2007 | Guinehut |
| 6,971,691 B1 | 12/2005 | Heatherington et al. | 7,240,933 B2 | 7/2007 | Glasgow et al. |
| 6,971,692 B2 | 12/2005 | Gioia et al. | 7,255,378 B1 | 8/2007 | Baccouche et al. |
| 6,971,694 B2 | 12/2005 | Sakuma et al. | D549,993 S | 9/2007 | Guiles et al. |
| 6,974,166 B2 | 12/2005 | Ledford et al. | 7,273,247 B2 | 9/2007 | Grueneklee et al. |
| 6,976,718 B2 | 12/2005 | Nakanishi | 7,275,781 B2 | 10/2007 | Wakefield |
| 6,983,832 B2 | 1/2006 | Namuduri et al. | 7,278,667 B2 | 10/2007 | Mohapatra et al. |
| 6,983,964 B2 | 1/2006 | Murata et al. | 7,290,783 B2 | 11/2007 | Dornbos |
| 6,986,536 B1 | 1/2006 | Heatherington et al. | 7,290,810 B2 | 11/2007 | Stenbach et al. |
| 6,988,753 B1 | 1/2006 | Omura et al. | 7,290,811 B1 | 11/2007 | Arns |
| 6,988,754 B1 | 1/2006 | Watts | 7,290,812 B2 | 11/2007 | Smith et al. |
| 6,994,384 B2 | 2/2006 | Shuler et al. | 7,296,833 B2 | 11/2007 | Mohapatra et al. |
| 6,997,490 B2 | 2/2006 | Evans et al. | 7,300,080 B2 | 11/2007 | Rebuffet et al. |
| 7,000,975 B2 | 2/2006 | Haneda et al. | 7,316,432 B2 | 1/2008 | Muskos |
| 7,004,519 B2 | 2/2006 | Roussel et al. | 7,325,861 B2 | 2/2008 | Zacheiss et al. |
| 7,011,350 B2 | 3/2006 | Stol et al. | 7,337,642 B2 | 3/2008 | Lyons et al. |
| 7,011,360 B2 | 3/2006 | Lanard et al. | 7,338,038 B2 | 3/2008 | Maurer et al. |
| 7,017,960 B2 | 3/2006 | Reierson et al. | 7,340,833 B2 | 3/2008 | Weissenborn et al. |
| 7,021,686 B2 | 4/2006 | Glasgow et al. | 7,341,299 B1 | 3/2008 | Baccouche et al. |
| 7,025,396 B2 | 4/2006 | Omura et al. | 7,344,008 B1 | 3/2008 | Jonsson et al. |
| 7,029,044 B2 | 4/2006 | Browne et al. | 7,347,465 B2 | 3/2008 | Jayasuriya et al. |
| 7,036,844 B2 | 5/2006 | Hammer et al. | 7,357,430 B2 | 4/2008 | Kariander |
| 7,044,514 B2 | 5/2006 | Mustafa et al. | 7,357,432 B2 | 4/2008 | Roll et al. |
| 7,044,515 B2 | 5/2006 | Mooijman et al. | 7,360,811 B2 | 4/2008 | Roll et al. |
| 7,052,056 B2 | 5/2006 | Weissenborn et al. | 7,370,893 B2 | 5/2008 | Tamada et al. |
| 7,059,590 B2 | 6/2006 | Bronstad | 7,628,444 B2 * | 12/2009 | Cormier et al. ........ 296/187.03 |
| 7,059,642 B2 | 6/2006 | Ohno et al. | 2002/0060462 A1 | 5/2002 | Glance |
| 7,066,509 B2 | 6/2006 | Kolaritsch et al. | 2002/0060463 A1 | 5/2002 | Gotanda et al. |
| 7,070,217 B2 | 7/2006 | Longo | 2002/0101086 A1 | 8/2002 | Koch et al. |
| 7,073,831 B2 | 7/2006 | Evans | 2003/0020219 A1 | 1/2003 | Konenberg |
| 7,077,438 B2 | 7/2006 | Albers et al. | 2003/0141729 A1 | 7/2003 | Burkhardt et al. |
| 7,077,439 B2 | 7/2006 | White et al. | 2003/0155782 A1 | 8/2003 | Iino |
| 7,077,441 B2 | 7/2006 | Lee | 2003/0164618 A1 | 9/2003 | Gentle |
| 7,077,442 B2 | 7/2006 | Arns | 2004/0003974 A1 | 1/2004 | Ashmead |
| 7,086,690 B2 | 8/2006 | Shuler et al. | 2004/0051321 A1 | 3/2004 | Hanai et al. |
| 7,093,866 B2 | 8/2006 | Toneatti et al. | 2004/0124645 A1 | 7/2004 | Koch |
| 7,097,221 B2 | 8/2006 | Andrasic et al. | 2004/0160071 A1 | 8/2004 | Suganuma et al. |
| 7,097,234 B2 | 8/2006 | Schonebeck | 2004/0174025 A1 | 9/2004 | Converse et al. |
| 7,100,952 B2 | 9/2006 | Reierson et al. | 2004/0251716 A1 | 12/2004 | Choi et al. |
| 7,108,092 B2 | 9/2006 | Suwa et al. | 2005/0040660 A1 | 2/2005 | Evans |
| 7,108,303 B2 | 9/2006 | Bladow et al. | 2005/0077739 A1 | 4/2005 | Vismara et al. |
| 7,131,674 B2 | 11/2006 | Evans et al. | 2005/0082853 A1 | 4/2005 | Wallman |
| 7,134,700 B2 | 11/2006 | Evans | 2005/0087999 A1 | 4/2005 | Campbell et al. |
| 7,143,856 B2 | 12/2006 | Takahashi et al. | 2005/0104392 A1 | 5/2005 | Liebhard et al. |
| 7,144,054 B2 | 12/2006 | Evans | 2005/0196233 A1 | 9/2005 | Vijay et al. |
| 7,144,055 B2 | 12/2006 | Kimura et al. | 2005/0213478 A1 | 9/2005 | Glasgow et al. |
| 7,147,258 B2 | 12/2006 | Evans et al. | 2005/0225102 A1 | 10/2005 | Wallman et al. |
| 7,156,433 B2 | 1/2007 | Evans | 2005/0269823 A1 | 12/2005 | DeVoursney et al. |
| 7,159,911 B2 | 1/2007 | Nguyen et al. | 2005/0269824 A1 | 12/2005 | Steeg et al. |
| 7,160,621 B2 | 1/2007 | Chaudhari et al. | 2006/0001277 A1 | 1/2006 | Melis et al. |
| 7,163,241 B2 | 1/2007 | Liu et al. | 2006/0001278 A1 | 1/2006 | Evans et al. |
| 7,163,242 B2 | 1/2007 | Shuler et al. | 2006/0028032 A1 | 2/2006 | Henseleit |
| 7,163,243 B2 | 1/2007 | Evans | 2006/0028035 A1 | 2/2006 | Bechtold et al. |
| 7,165,794 B2 | 1/2007 | Banry et al. | 2006/0028038 A1 | 2/2006 | Glasgow et al. |
| 7,172,227 B2 | 2/2007 | Weissenborn et al. | 2006/0061111 A1 | 3/2006 | Ignafol |
| 7,188,876 B2 | 3/2007 | Jaarda et al. | 2006/0066116 A1 | 3/2006 | Straughn |
| 7,188,890 B1 | 3/2007 | Baccouche et al. | 2006/0071486 A1 | 4/2006 | Lamparter |
| 7,189,040 B2 | 3/2007 | Sharp et al. | 2006/0082169 A1 | 4/2006 | Kuhne |
| 7,192,068 B1 | 3/2007 | Kim | 2006/0125254 A1 | 6/2006 | Arns et al. |
| 7,198,309 B2 | 4/2007 | Reynolds | 2006/0131902 A1 | 6/2006 | Shimoda |
| 7,201,412 B2 | 4/2007 | Kashiwagi et al. | 2006/0145490 A1 | 7/2006 | Yamaguchi et al. |
| 7,201,413 B2 | 4/2007 | Hillekes et al. | 2006/0169906 A1 | 8/2006 | Bhatt |
| 7,201,414 B2 | 4/2007 | Iketo et al. | 2006/0181090 A1 | 8/2006 | Boivin et al. |
| 7,204,531 B2 | 4/2007 | Kim | 2006/0186569 A1 | 8/2006 | Olive et al. |

| | | | | | | |
|---|---|---|---|---|---|---|
| 2006/0186702 A1 | 8/2006 | Kisanuki et al. | 2007/0229747 A1 | 10/2007 | Chung | |
| 2006/0196134 A1 | 9/2006 | Livernois | 2007/0246956 A1 | 10/2007 | Nagai et al. | |
| 2006/0226665 A1 | 10/2006 | Kwok | 2007/0257497 A1 | 11/2007 | Heatherington et al. | |
| 2006/0237976 A1 | 10/2006 | Glasgow et al. | 2007/0267877 A1 | 11/2007 | Arns | |
| 2006/0244274 A1 | 11/2006 | Frank et al. | 2007/0278803 A1 | 12/2007 | Jaarda et al. | |
| 2006/0255602 A1 | 11/2006 | Evans | 2007/0284895 A1 | 12/2007 | Toneatti et al. | |
| 2006/0255604 A1 | 11/2006 | Condeelis | 2007/0284896 A1 | 12/2007 | Wakabayashi et al. | |
| 2006/0261613 A1 | 11/2006 | Byers et al. | 2008/0001416 A1 | 1/2008 | Chaudhari et al. | |
| 2007/0007780 A1 | 1/2007 | Lagiewka et al. | 2008/0012364 A1 | 1/2008 | Boggess | |
| 2007/0024069 A1 | 2/2007 | Takagi et al. | 2008/0012365 A1 | 1/2008 | Harvey | |
| 2007/0029824 A1 | 2/2007 | Hodoya et al. | 2008/0012386 A1 | 1/2008 | Kano et al. | |
| 2007/0040398 A1 | 2/2007 | Lutke-Bexten et al. | 2008/0023972 A1 | 1/2008 | Ohno et al. | |
| 2007/0046042 A1 | 3/2007 | Campbell et al. | 2008/0029932 A1 | 2/2008 | Zietlow et al. | |
| 2007/0046043 A1 | 3/2007 | Ito | 2008/0030031 A1 | 2/2008 | Nilsson | |
| 2007/0046044 A1 | 3/2007 | Tanabe | 2008/0036225 A1 | 2/2008 | Ji et al. | |
| 2007/0056819 A1 | 3/2007 | Kano et al. | 2008/0041455 A1 | 2/2008 | Hsiao | |
| 2007/0074556 A1 | 4/2007 | Heatherington | 2008/0042454 A1 | 2/2008 | Garnweidner | |
| 2007/0095001 A1 | 5/2007 | Heatherington | 2008/0042455 A1 | 2/2008 | Nees | |
| 2007/0108778 A1 | 5/2007 | Evans et al. | 2008/0048462 A1 | 2/2008 | Zabik | |
| 2007/0114772 A1 | 5/2007 | Evans | 2008/0054654 A1 | 3/2008 | Dahyabhai | |
| 2007/0132251 A1 | 6/2007 | Lee | 2008/0054655 A1 | 3/2008 | Kizaki et al. | |
| 2007/0138815 A1 | 6/2007 | Fukukawa et al. | 2008/0054656 A1 | 3/2008 | Guiles et al. | |
| 2007/0145755 A1 | 6/2007 | Shioya et al. | 2008/0061567 A1 | 3/2008 | Mae et al. | |
| 2007/0176440 A1 | 8/2007 | Henseleit | 2008/0067838 A1 | 3/2008 | Nakamae et al. | |
| 2007/0176442 A1 | 8/2007 | Mori et al. | 2008/0067905 A1 | 3/2008 | Guiles | |
| 2007/0180880 A1 | 8/2007 | Lyons et al. | 2008/0073926 A1 | 3/2008 | Azzouz et al. | |
| 2007/0182172 A1 | 8/2007 | Hasegawa | 2008/0088141 A1 | 4/2008 | Adachi et al. | |
| 2007/0187958 A1 | 8/2007 | Bouchez et al. | | FOREIGN PATENT DOCUMENTS | | |
| 2007/0187959 A1 | 8/2007 | Adachi et al. | EP | 1103428 A2 | 5/2001 | |
| 2007/0200374 A1 | 8/2007 | Troton et al. | GB | 1550100 A | 8/1979 | |
| 2007/0200375 A1 | 8/2007 | Ito et al. | GB | 2033535 A | 5/1980 | |
| 2007/0200376 A1 | 8/2007 | Jaarda et al. | JP | 9240393 A | 9/1997 | |
| 2007/0216198 A1 | 9/2007 | Nakamae et al. | WO | WO9703865 A1 | 2/1997 | |
| 2007/0222237 A1 | 9/2007 | Kemp et al. | WO | WO0100478 A1 | 1/2001 | |
| 2007/0228706 A1 | 10/2007 | Nagae et al. | | | | |
| 2007/0228746 A1* | 10/2007 | Cormier et al. ............. 293/102 | * cited by examiner | | | |

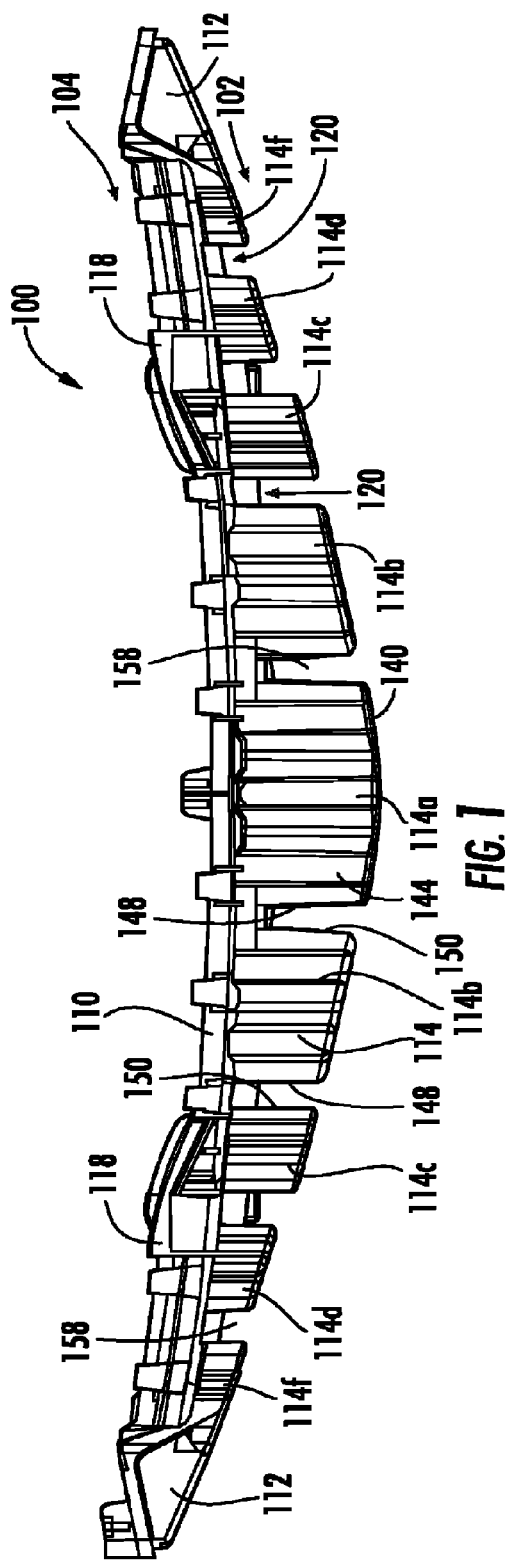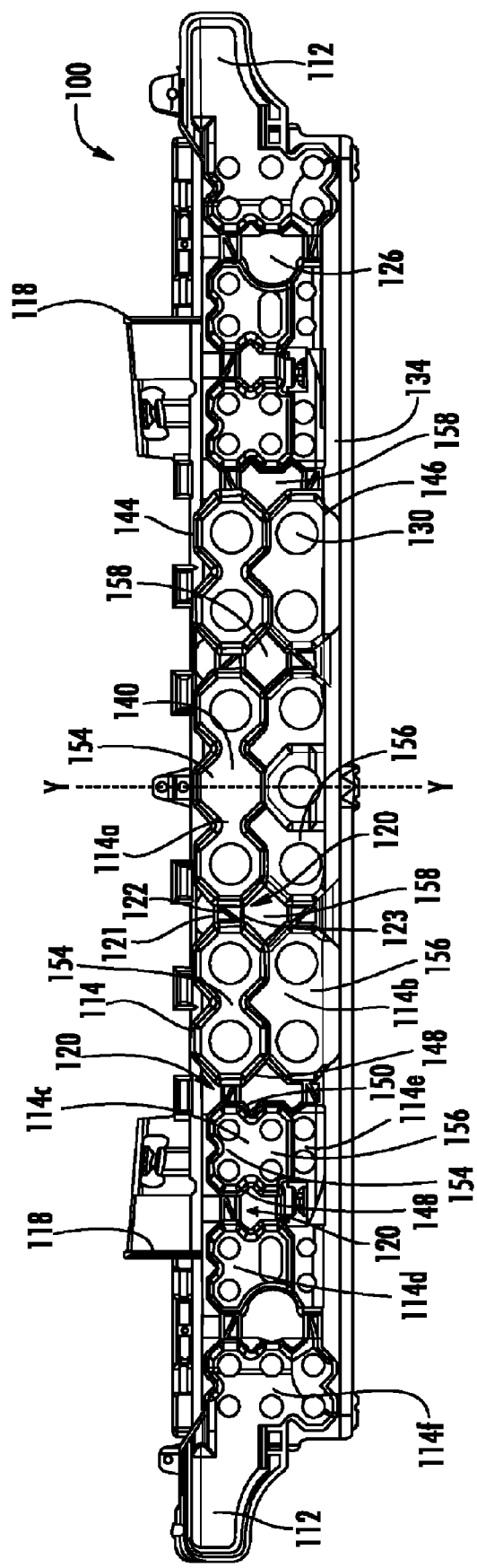

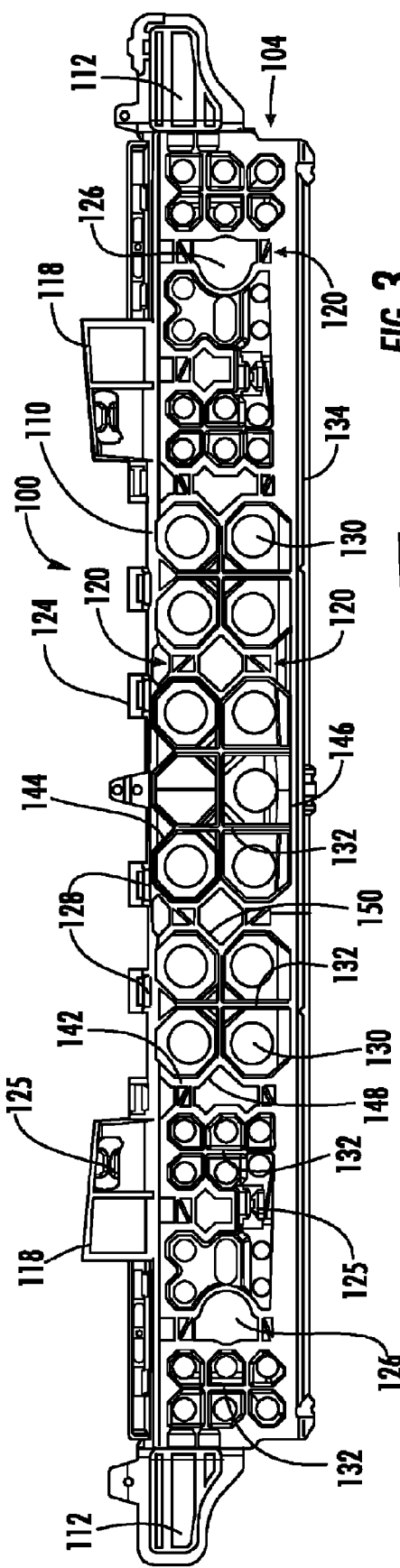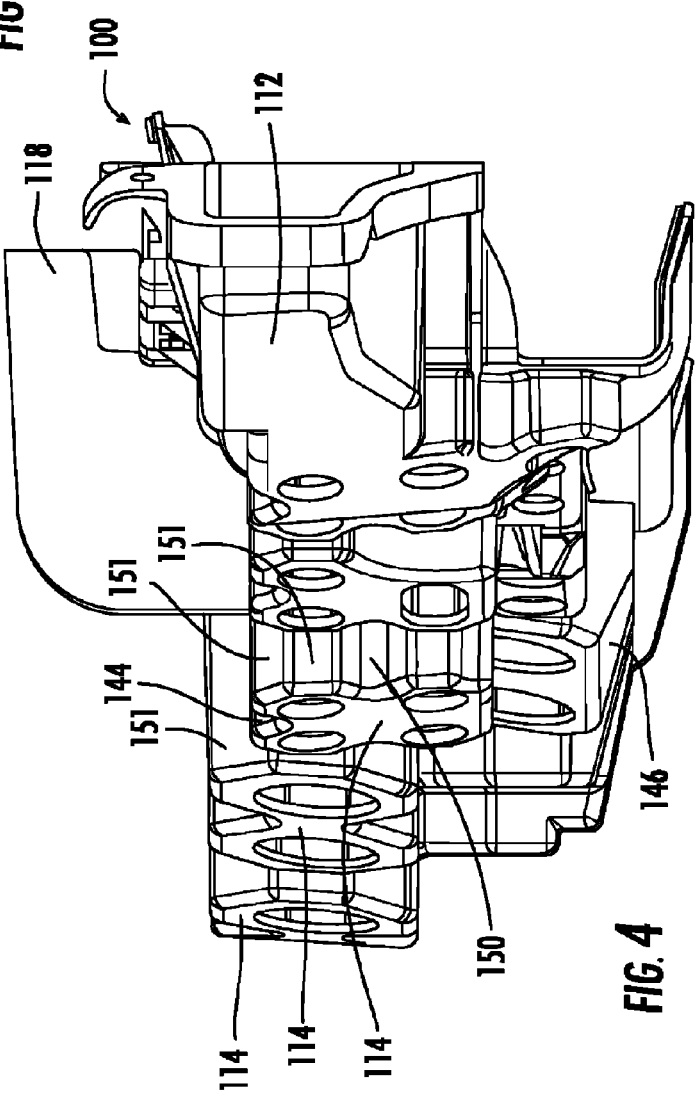

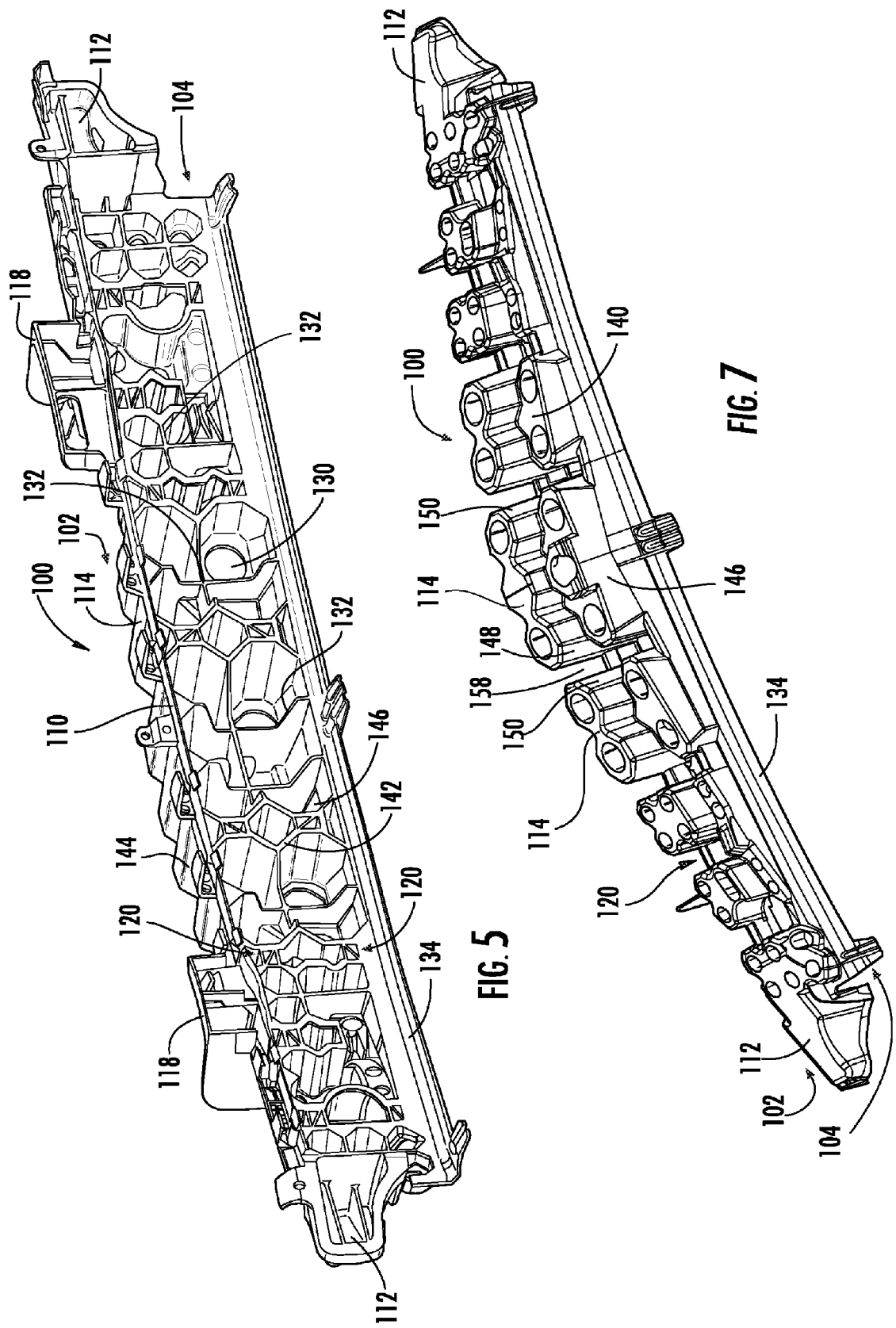

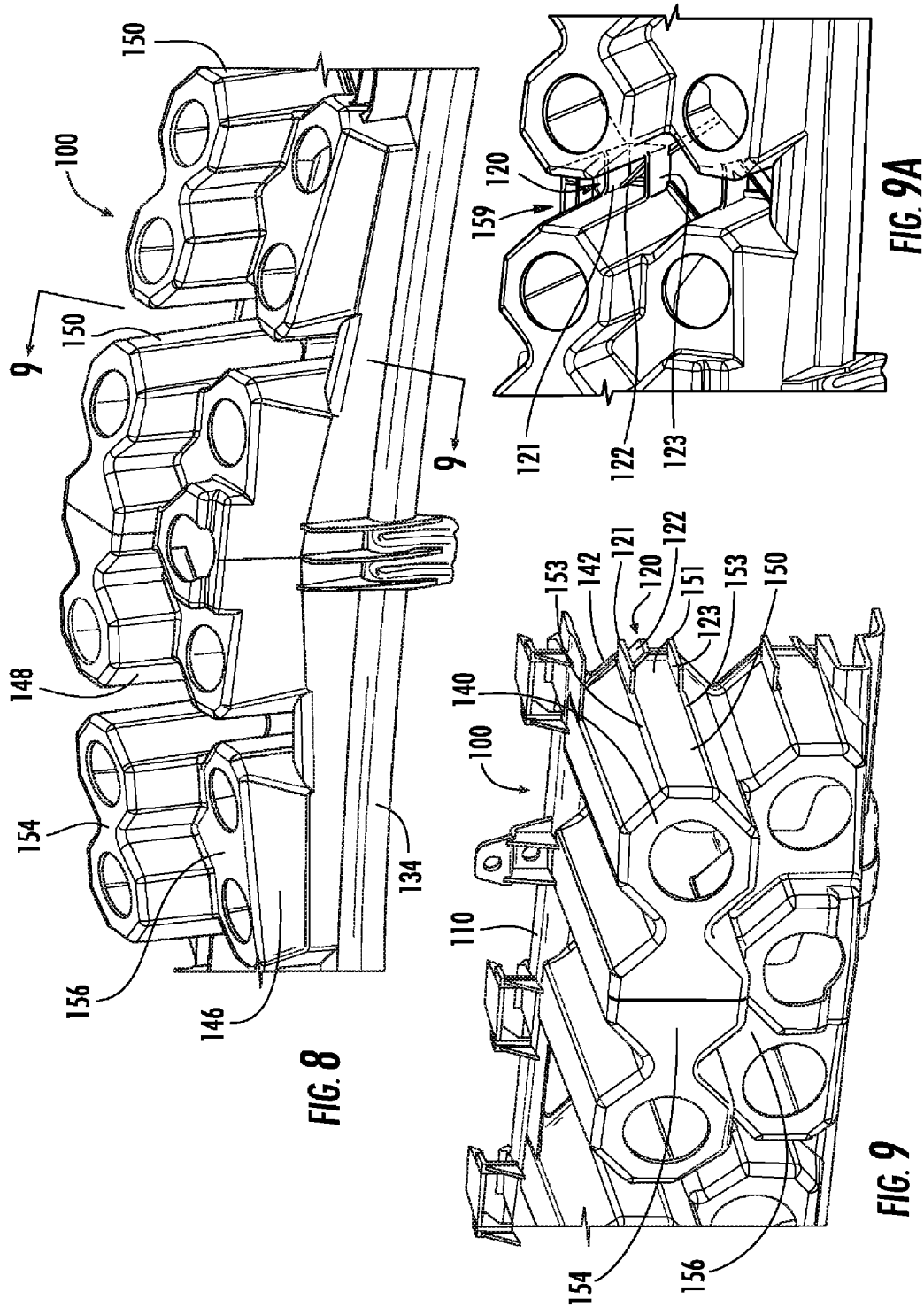

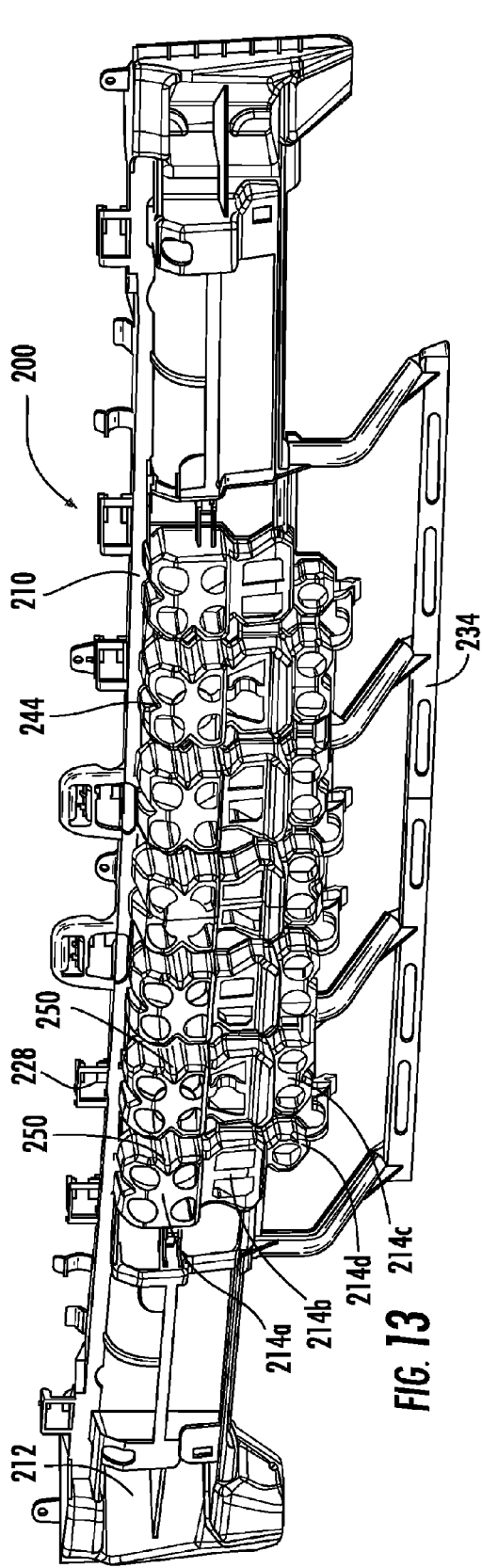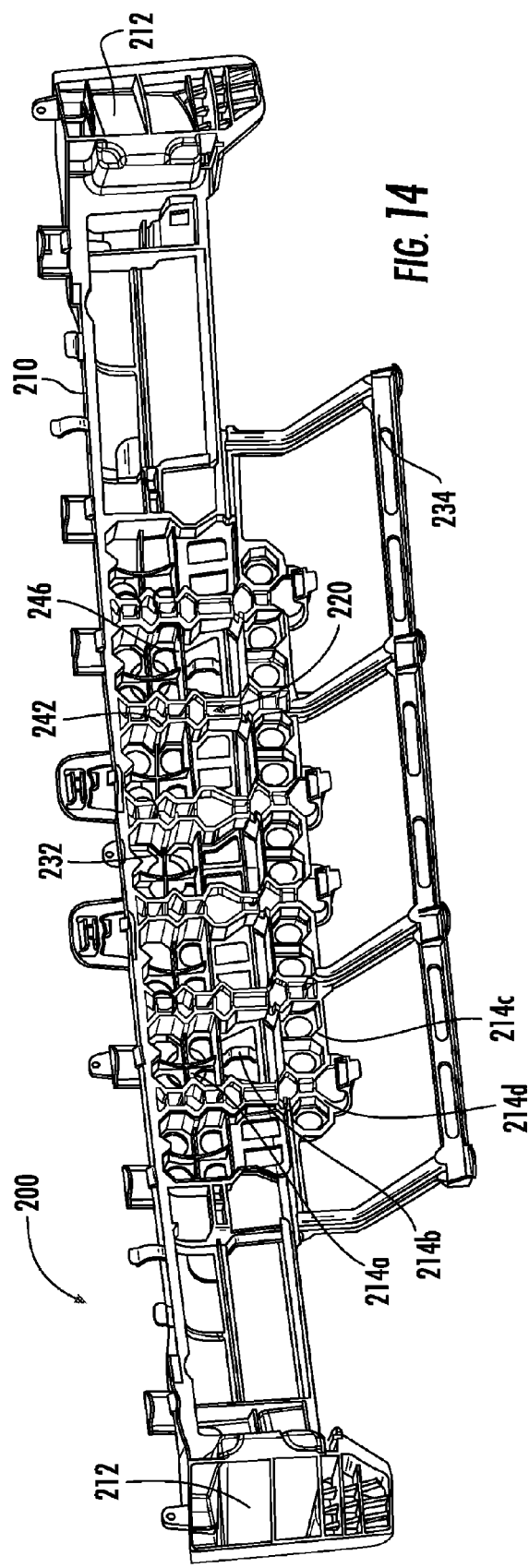

ENERGY ABSORBER FOR VEHICLE

CROSS-REFERENCE TO RELATED PATENT APPLICATIONS

The present application claims the benefit under 35 U.S.C. §119(e) of U.S. Provisional Application No. 61/043,331 filed Apr. 8, 2008, the entire disclosure of which is hereby incorporated by reference.

BACKGROUND

The present application relates generally to the field of bumpers and bumper assemblies for vehicles such as automobiles and the like. More specifically, the present application relates to energy absorbers used in bumper assemblies.

Vehicle bumper assemblies may include a bumper beam, an energy absorber, and a fascia. Such bumper assemblies may be shipped to a vehicle manufacturer as a preassembled unit or the individual components may be shipped separately and assembled by the vehicle manufacturer during the vehicle assembly process.

The bumper beam is configured to couple to the frame of a vehicle, and is generally made of a metal such as steel or other suitable metals. The bumper beam is typically an elongated metal beam that is positioned such that it extends laterally across the front or rear of the vehicle (the bumper beam may have a relatively linear shape or may have a curvature in which the center of the beam is bowed outward toward the front and rear of the vehicle, for example). The bumper beam may be formed using any suitable method (e.g., casting, extruding, etc.). One possible bumper beam forming method involves roll-forming a sheet of metal into a beam having a predefined cross-section. One particular embodiment of a bumper beam includes a "B-shaped" cross-section, although any suitable configuration may be used for the bumper beam.

The fascia may be made of any suitable material (e.g., a polymeric material such as polypropylene, a reinforced polymeric material such as fiberglass, or other suitable materials), and acts to conceal the other components of the bumper system (i.e., the fascia is the part of the bumper system that is visible to an observer of the exterior of the vehicle). Any of a variety of configurations may be possible for the fascia, and may be selected to match the exterior styling of a particular vehicle.

The energy absorber is provided between the fascia and the bumper beam, and provides a cushion in the event of a collision. As the name implies, the energy absorber is configured to absorb the collision energy to reduce the amount of energy transmitted to the bumper beam and to the rest of the vehicle (e.g., to the vehicle frame).

It would be advantageous to provide an energy absorber for a vehicle bumper assembly or system that is relatively efficient to produce and that includes features intended to optimize performance of the bumper system in the event of a collision. It would also be advantageous to provide an energy absorber that utilizes less material to provide both cost and weight savings for the bumper assembly. It would further be advantageous to provide an energy absorber that includes features intended to improve the performance of the bumper assembly in the event of a collision.

SUMMARY

An exemplary embodiment relates to an energy absorber for a vehicle bumper system includes a plurality of crush boxes that are configured to absorb impact energy. Each of the plurality of crush boxes are generally hollow and have a front wall and a plurality of side walls integrally formed with and extending from the front wall to a rear of the energy absorber. A first crush box is separated from a second crush box by a distance such that an open space is defined between a side wall of the first crush box and a side wall of the second crush box. At least one rib extends between the side wall of the first crush box and the side wall of the second crush box in the open space to couple the first crush box to the second crush box. The at least one rib is integrally formed with the first crush box and the second crush box, and extends at least partially between the rear of the energy absorber and the front walls of the first and second crush boxes.

Another exemplary embodiment relates to an energy absorber that is configured for use with a vehicle bumper beam. A first generally hollow crush box and a second generally hollow crush box each extend from a rear of the energy absorber to a location forward of the rear of the energy absorber, wherein the first crush box is separated from the second crush box by an open space extending through the energy absorber. A plurality of generally planar connection members extend across the open space to couple the first crush box to the second crush box. The plurality of connection members extend along sidewalls of the first crush box and the second crush box forward from a location near the rear of the energy absorber. The plurality of connection members are spaced apart from each other so that at least one open space is defined between the plurality of connection members.

Another exemplary embodiment relates to an energy absorber configured to contact a bumper beam. The energy absorber includes a first crush box comprising a first row and a second row of linearly aligned interconnected polygonal protrusions extending substantially forward from a rear of the energy absorber. The energy absorber also includes a second crush box spaced a distance from the first crush box comprising a first row and a second row of linearly aligned interconnected polygonal protrusions extending substantially forward from the rear of the energy absorber. The energy absorber further includes a first rib arrangement coupling the first row of the first crush box and the first row of the second crush box at a first pair of walls that are substantially parallel to each other and spaced a distance apart, wherein a first rib of the rib arrangement is substantially perpendicular to the first pair of walls and extends a length forward from near the rear of the energy absorber.

BRIEF DESCRIPTION OF THE DRAWINGS

FIG. 1 is a top plan view of a vehicle energy absorber according to an exemplary embodiment.

FIG. 2 is a front plan view of the vehicle energy absorber shown in FIG. 1.

FIG. 3 is a rear plan view of the vehicle energy absorber shown in FIG. 1.

FIG. 4 is a side isometric view of the vehicle energy absorber shown in FIG. 1.

FIG. 5 is a rear isometric view of the vehicle energy absorber shown in FIG. 1.

FIG. 7 is a perspective view of the vehicle energy absorber shown in FIG. 1.

FIG. 8 is a partial perspective view of the vehicle energy absorber shown in FIG. 1.

FIG. 9 is a cross-sectional view of the vehicle energy absorber shown in FIG. 1 taken along line 9-9 in FIG. 8.

FIG. 9A is a detail view of the rib arrangements shown in FIG. 8 coupling parallel walls of adjacent crush boxes.

FIG. 13 is a rear isometric view of the vehicle energy absorber shown in FIG. 10.

FIG. 14 is a front isometric view of the vehicle energy absorber shown in FIG. 10.

DETAILED DESCRIPTION

Referring to FIGS. 1-9, an exemplary embodiment of a vehicle energy absorber 100 is illustrated for use in a bumper system for a vehicle. Although the energy absorber 100 as shown is intended for use at the front of a vehicle, according to other exemplary embodiments, the energy absorber 100 may be adapted for use at the back or rear of a vehicle. For the purposes of this application, the front of the energy absorber will be defined from the perspective of a person outside and at the front of a vehicle facing the bumper system, while the rear of the energy absorber will be defined as the direction facing substantially opposite or away from the front. The bottom of the energy absorber will be defined as generally in the direction of the ground, i.e., the surface of the earth, while the top of the energy absorber will be defined as the direction facing substantially opposite or away from the bottom. The longitudinal direction of the vehicle will be generally defined as the direction extending front to rear. The vertical direction of the vehicle will be generally defined substantially normal to the earth, top being vertically above bottom, while the horizontal direction of the vehicle will be defined as substantially perpendicular to the vertical direction and extending laterally between a left side to a right side of the energy absorber.

Figure 6:
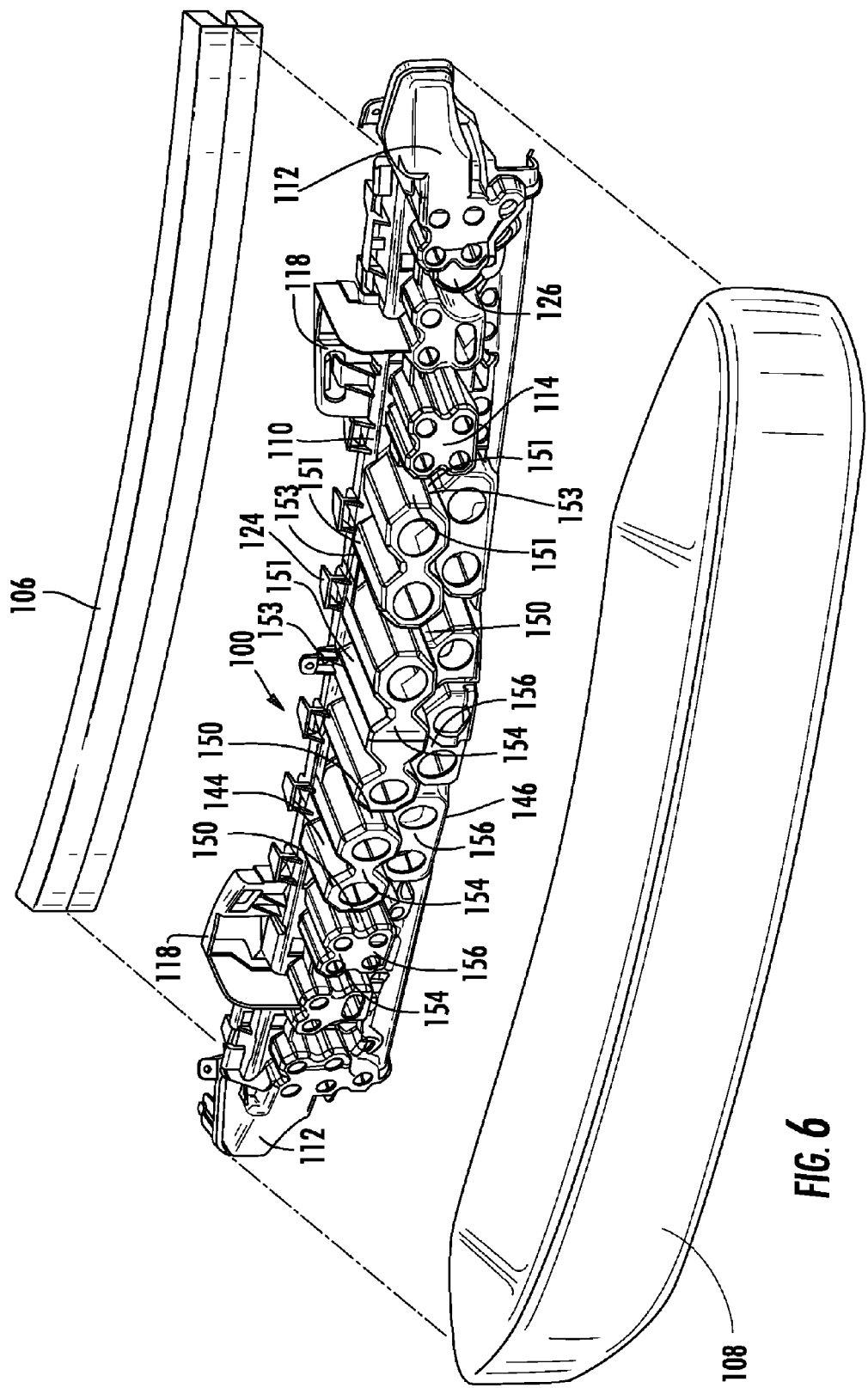
FIG. 6 is an exploded front isometric view of the vehicle energy absorber shown in FIG. 1 in an exemplary bumper system.

According to an exemplary embodiment, the energy absorber 100 having a front or front side 102 and a rear or rear side 104 is intended for use in a bumper system that includes a bumper beam 106 and a fascia 108 (see, e.g., FIG. 6). For example, the energy absorber 100 may be provided in contact with a bumper beam having a B-shaped or other cross-sectional configuration. The rear of the energy absorber 100 is in contact with the bumper beam and the energy absorber may extend horizontally along the entire width of the bumper beam or along a portion thereof. The energy absorber may be coupled to the fascia using fasteners, hooks, clips, adhesives, or other suitable means, or may instead by sandwiched between the bumper beam and the fascia without the use of any fastening mechanisms.

The energy absorber 100 includes a support beam 110, one or more side crush supports 112, a plurality of crush boxes 114, at least one member 118 configured to act as an air flow regulator, a plurality of rib arrangements 120, at least one extension 124 for aligning the energy absorber with a bumper beam, at least one tow hook access hole 126, a plurality of wire harness clips 128, and a lower flange support 134.

An exemplary energy absorber may be made from a polymeric material such as polyethylene, thermoplastic olefin, or a combination of polycarbonate and polybutylene terephthalate but is not limited thereto. According to an exemplary embodiment, the energy absorber is manufactured using an injection molding process.

Referring to FIGS. 1-2, the energy absorber 100 includes a plurality of crush boxes 114, which vary in length and shape and are designed to manage or control impact energy by buckling and deflecting during a dynamic impact between the vehicle's bumper and another object.

An exemplary crush box 114 may be constructed of multiple polygon shaped protrusions, i.e., polygonal protrusions, linearly aligned and interconnected with one another, which may protrude or extend longitudinally towards the front, i.e., forward, at varying lengths from the rear of the energy absorber (see, e.g., FIG. 4, which illustrates crush boxes formed from polygonal protrusions which extend outward to varying lengths). In one exemplary embodiment, the crush boxes may be constructed having a variety of configurations wherein the shape, size, length, number, and relative position or arrangement of the polygon shaped protrusions are varied. Crush boxes 114a, 114b, 114c, 114d, 114e, and 114f illustrate a variety of exemplary crush box configurations. It should be understood that the size, shape, and/or configuration of the crush boxes may vary according to other exemplary embodiments.

According to an exemplary embodiment, each crush box 114 is generally a hollow member including a front side 140, a rear side or edge 142, a top 144, a bottom 146, a first side 148, and a second side 150 (see, e.g., FIG. 5 illustrating the rear side or edge of a crush box). The top 144, the bottom 146, the first side 148, and the second side 150 of each crush box 114 extend substantially longitudinally forward from the rear side 142 to the front side 140 of the crush box, wherein the front side 140 may include a front surface of the crush box (see, e.g., FIGS. 8-9).

The tops 144, the bottoms 146, the first sides 148, and the second sides 150 of the crush boxes comprise a plurality of longitudinally extending walls 151 extending between the front sides and the rear sides of the crush boxes. In an exemplary embodiment, the walls 151 are generally planar members (see, e.g., FIG. 4 illustrating the side walls as substantially rectangular planar members) that may be substantially vertical, substantially horizontal, or angled. Referring to FIG. 6, a plurality of corners 153 is shown also extending from the rear sides to the front sides of the crush boxes. It should be understood to those reviewing the present disclosure that the corners 153 may be viewed as part of the walls 151 or independent therefrom.

Referring to FIG. 2, the crush box 114a includes three linearly aligned interconnected octagonal protrusions on top, extending forward from the rear of the energy absorber. The three top protrusions are integrally formed with three linearly aligned interconnected octagonal protrusions on the bottom, extending forward from the rear of the energy absorber. The top three protrusions define a first or top row 154, extending horizontally along the width of the energy absorber 100. The bottom three protrusions form a second or bottom row 156, extending horizontally along the width of the energy absorber 100. The top row 154 extends forward a greater length from the rear of the energy absorber than the bottom row 156 (see, e.g., FIG. 6). The center protrusion of the bottom row 156 extends a greater length forward from the rear of the energy absorber than the outside protrusions in the bottom row 156.

The crush box 114b includes two linearly aligned interconnected octagonal protrusions on top, extending forward from the rear of the energy absorber 100. The top protrusions are integrally formed with two linearly aligned interconnected octagonal protrusions on the bottom, extending forward from the rear of the energy absorber 100. The top two protrusions define a first or top row 154, extending horizontally along the width of the energy absorber 100. The bottom two protrusions form a second or bottom row 156, extending horizontally along the width of the energy absorber 100. The top row 154 extends a greater length forward from the rear of the energy absorber 100 than the bottom row 156 (see, e.g., FIG. 6).

The crush box 114c includes four interconnected octagonal protrusions that extend forward from the rear of the energy absorber. The protrusions form a first or top row 154 and a second or bottom row 156, the top row 154 extending substantially the same length forward from the rear of the energy absorber 100 as the bottom row 156 (see, e.g., FIG. 6).

The crush boxes 114d, 114e and 114f include multiple interconnected polygonal protrusions, aligned in varying patterns, which extend longitudinally forward from the rear of the energy absorber (see, e.g., FIG. 6).

In an exemplary arrangement of the crush boxes 114 along the width of the energy absorber 100, the crush boxes 114 are shown adjacent to one another, spaced apart along the width of the energy absorber 100 between a first or left side to a second or right side. A plurality of spaces 158 (e.g., voids, openings, apertures, passages, etc.) separate adjacent crush boxes. The spaces 158 are open spaces substantially defined by the first sides 148 and the second sides 150 of the adjacent crush boxes. The spaces may extend longitudinally through the energy absorber, or between the front and the rear of the energy absorber. In another exemplary embodiment, the spaces may separate groupings of crush boxes, e.g., crush boxes that are integrally formed or coupled one on top of the other.

According to one exemplary embodiment, the crush boxes 114 at the at the center of the energy absorber 100 are spaced apart smaller distances, i.e., are closer together, than the crush boxes at the ends of the energy absorber 100. According to another exemplary embodiments, the crush boxes are substantially equidistant from one another. According to another exemplary embodiment, the crush boxes are spaced apart greater distances at the center, i.e., are father apart, than the crush boxes at the lateral ends of the energy absorber.

Referring to FIG. 2, the first side 148 of one crush box substantially faces and is spaced a distance from the second side 150 of an adjacent crush box. Referring to FIG. 9A, the corresponding first sides and second sides of adjacent crush boxes may include pairs of walls 159 that are substantially parallel to each other and separated a distance apart by the spaces 158. Depending on the configuration of the aligned crush boxes, the substantially parallel walls of adjacent crush boxes may be substantially opposite and vertically aligned or vertically offset, e.g., the walls are not in the same location relative to the top and bottom of the energy absorber, the wall are different sizes, etc.

Although FIG. 2 illustrates an exemplary embodiment of an energy absorber that is generally symmetric about a center axis (see dashed line Y-Y in FIG. 2), according to other exemplary embodiments, the energy absorber may not be symmetric (e.g., it may include features that are configured to be on one end or the other of the energy absorber).

According to other exemplary embodiments, different crush box designs may be provided and/or an energy absorber may include a different number and/or alignment of crush boxes. For example, other energy absorbers may be constructed to include a different number and/or configuration for the crush boxes such that the design may be customized for a particular customer specification (e.g., as to the width, height, thickness, strength and/or mass of the energy absorber).

As illustrated in FIG. 5, the various crush boxes included in the energy absorber 100 are generally hollow members that are configured to be compressed during a vehicle collision. Ribs or other features (e.g., members, elements, connectors, links, planks, connection members, cross members, crossbars, crosspieces, rungs, protrusions, plates, reinforcements, attachments, couplings, links, parts, rods, bars, poles, beams, supports, spacers, spokes, strips, ties) provide enhanced rigidity and strength for the crush boxes (see, e.g., FIG. 2).

The crush boxes (e.g., crush box 114) may include one or more apertures or holes 130 to provide for increased stability during molding. For example, where the mold for the energy absorber includes fingers, the energy absorber may be configured to allow the fingers to pass through the apertures during manufacture (see, e.g., FIG. 2 illustrating the apertures or holes 130 in the front sides of crush boxes). One advantageous feature of including the apertures or holes 130 in the crush boxes is that such apertures allow energy absorbers to be produced with less mass without compromising the buckling strength of the energy absorber (e.g., since the bulk of the strength for the crush boxes is provided by the longitudinally extending walls of the crush boxes).

Referring to FIG. 2, the crush boxes 114 may be coupled or connected to another crush box using a rib arrangement 120 (e.g., configuration, grouping, conformation, construction, framework, system, design, build, complex, layout, structure, etc.). Rib arrangements 120 may include an individual rib or a plurality of individual ribs that are generally connection or cross members coupling the sides of the adjacent crush boxes. The individual ribs may be constructed as a thin planar member oriented such that it extends forward longitudinally from or near the rear of the energy absorber towards the front of the energy absorber, i.e., in the same direction the polygon shaped protrusions extend relative to the rear of the energy absorber. The thin planar member may be shaped, for example, as a rectangle or a parallelogram. The individual ribs may further be constructed as a rod or a connection or cross member having one or more curved surfaces. In one exemplary embodiment, the ribs are integrally formed between side of adjacent crush boxes during an injection molding process.

In the exemplary embodiment shown, each rib is substantially rectangular and extends forward a length greater than height the rib extends vertically, i.e., substantially between the top and the bottom of the energy absorber. Generally, the ribs do not extend the entire length from the rear side of the crush box to the front side of the crush box. The ribs may be spaced a length forward from the rear sides of the adjacent crush boxes coupled by the rib. Alternatively, the ribs may be aligned with (e.g., planar with, even with, etc.) or extend in part beyond the rear sides of the adjacent crush boxes coupled by the ribs. When multiple support ribs are provided in a space between the top and bottom of the energy absorber, they are constructed without a front or rear face extending perpendicular to the longitudinally extending ribs.

As shown in FIG. 2, three ribs 121, 122, and 123 form an exemplary rib arrangement 120 that couples adjacent crush boxes together. Ribs 121 and 123 extend generally perpendicularly to the walls of the adjacent crush boxes at the first sides and the second sides and rib 122 is inclined relative to the other two ribs such that the front profiles of the ribs 121, 122, and 123 form a Z-shape. Further, the cross section of the ribs forms a Z-shape.

Rows of adjacent crush boxes may be coupled by individual ribs or rib structures extending across spaces 158 separating the crush boxes. According to the exemplary energy absorber shown in FIG. 2, the top row 154 of the crush box 114a is coupled at the first side 150 to the top row 154 of the crush box 114b at the second side 150. Further, the bottom row 156 of the crush box 114a is coupled at the first side 148 to the bottom row 156 of the crush box 114b at the second side 150. Further, the top row 154 of the crush box 114b is coupled at the second side to the top row 154 of the crush box 114c at the second side 150, and the bottom row 156 of the crush box 114c is coupled at the second side 150.

In one exemplary embodiment, the tops rows of adjacent crush boxes are coupled at a pair of parallel walls and the bottom rows are coupled at a pair of parallel walls. The ribs may be oriented perpendicularly to the parallel walls. Some of the ribs may be parallel to each other, forming a ladder-like structure in the open space between the adjacent crush boxes. In the exemplary embodiment shown, the parallel walls are coupled by the exemplary rib arrangements 120 spaced a distance apart in the spaces 158 between the top and the bottom of the energy absorber 100.

In another exemplary embodiment, adjacent crush boxes may be coupled at corners by ribs extending forward from near the rear of the crush boxes along the coupled corners at each side (see, e.g., FIG. 2). Alternatively, the corners may extend from the rear of the crush boxes and even from in part beyond the rear of the crush boxes. In another exemplary embodiment, one or more ribs may extend longitudinally between adjacent crush boxes coupling non-parallel walls.

According to one exemplary embodiment, a single crush box may be coupled at one side to two or more adjacent crush boxes that are vertically aligned one above the other (see, e.g., FIG. 2 illustrating the crush box 114e substantially below and integrally formed with the crush box 114c, both coupled to the crush box 114b as described above). According to other exemplary embodiments, one set of vertically aligned crush boxes may be coupled to another adjacent set of vertically aligned crush boxes.

FIG. 9 illustrates a cross-sectional view showing an exemplary construction of a rib arrangement 120. The exemplary rib arrangement 120 is substantially rectangular and connects a first crush box at the second side to an adjacent second crush box at the first side. In one exemplary embodiment, multiple adjacent support ribs may include an additional support which may bridge cross corners of two separate ribs to provide additional support. This additional support that bridges two separate adjacent support ribs is illustrated as being shorter in the forward longitudinal direction than the two separate adjacent ribs, but may be the same length as the adjacent support ribs.

One advantageous feature of using ribs to connect adjacent crush boxes is that less material may be used than if the crush boxes were connected by a single wall extending between the crush boxes. The orientation of the ribs is such that they provide enhanced rigidity for the energy absorber by extending longitudinally between the front and rear of the energy absorber between adjacent walls as compared to a simple wall extending between the top and bottom of the energy absorber between adjacent walls. That is, a wall having a major surface that is oriented such that the plane of the major surface is generally parallel to the rear of the energy absorber may have a tendency to flex when a load is applied to the energy absorber. In contrast, by orienting the ribs or connection members between the crush boxes such that they are perpendicular to the typical impact direction (i.e., from front to rear with respect to the energy absorber), the ribs provide better resistance to flexure or bending of the energy absorber and enhanced structural rigidity for the energy absorber.

Referring back to FIG. 2, an exemplary energy absorber may include one or more members 118 (e.g., walls, fins, extensions, dams, projections, etc.) configured to act as air flow regulators for the energy absorber. The members 118 may be integrally formed with the rest of the energy absorber and formed of the same material. The members 118 may act to prevent air traveling perpendicular to the front of the energy absorber above the energy absorber from traveling laterally along the energy absorber by blocking the air flow path (e.g., air may be forced to stay between the two members 118 illustrated in FIG. 2 when the energy absorber is positioned within the vehicle). The members 118 may have a size and shape configured to generally match the profile of an overlying fascia. According to one exemplary embodiment, there is clearance between the members 118 and the fascia. According to other exemplary embodiments, the members 118 engage the fascia to form a partial seal to restrict airflow further. According to other exemplary embodiments, the members may be constructed to include various ribs or fins to improve or redirect air flow to specific locations with the intended purpose of increasing the thermal efficiency of the vehicle.

Further referring to FIG. 2, the exemplary energy absorber 100 may include a side crush support 112 positioned at each outward end of the energy absorber in a cross car direction. An exemplary side crush support 112 is designed so that its face is aligned at an optimal offset angle, e.g., 45 degrees from the longitudinal direction that runs front to rear of the vehicle. This offset angle is intended to improve impact resistance of the energy absorber for non-longitudinal impacts.

Referring to FIG. 3, an exemplary energy absorber may include extensions 124 that are integrally formed with the energy absorber and are intended to provide for relatively convenient alignment between the energy absorber and the bumper beam. That is, the extensions 124 are intended to provide a "guide" for aligning the energy absorber with the bumper beam, but no secure coupling is provided between the energy absorber and the bumper beam, e.g., no fasteners or clips are used to secure the parts together.

According to other exemplary embodiments, the extensions 124 may be replaced or supplemented with clips (not shown) that utilize the elastic nature of the molded polymer to allow for elastic deflection of the snap past an interference of a slot or hook feature of the bumper beam or other structure. Once the snap moves past the interference it will return to or near its original shape and the snap configuration which incorporates a catch will secure the joined components in place. According to another exemplary embodiment, the extensions 124 may be replaced or supplemented with other mechanisms sufficient to couple the energy absorber to the bumper beam or other structures.

According to an exemplary embodiment, a tow hook access hole 126 is formed at one or more locations to provide the vehicle user with access to the tow hooks. In one embodiment, the tow access hole is in part provided by including a cut-out portion in one or more of the polygon shaped protrusions forming the crush box or crush boxes through which the access hole extends, i.e., the access hole is formed simultaneously with the crush boxes. The tow hook access hole geometry may differ according to other exemplary embodiments and is designed to satisfy the customer-desired geometry.

According to an exemplary embodiment, a plurality of clips 128 are molded into the energy absorber to provide for attachment of the vehicle wiring harness, which is typically routed through the energy absorber. The number and size of the clips may be varied according to specific customer requirements. One or more clips 125 may also be provided for securing the energy absorber to the fascia or another structure. In other exemplary embodiments, any mechanism configured to provide for attachment of the vehicle wiring harness or securing the energy absorber to the fascia or another structure may be used. These mechanisms may be molded into the energy absorber or coupled thereto.

As shown in FIG. 5, an exemplary energy absorber includes a plurality of internal crush box ribs 132. The crush box ribs 132 are located inside the crush boxes 114 and are generally thin planar members that extend longitudinally in the direction of protrusion of the crush box. The crush box ribs 132 may run the entire length of the crush box from front to rear or any length shorter than the crush box protrusion length. In one exemplary embodiment, the crush box ribs may be constructed as single ribs which have horizontal or vertical orientations. In another exemplary embodiment, the ribs may be constructed using a cross shape cross section, incorporating a rib having a vertical orientation and a rib having a horizontal orientation (see, e.g., FIG. 5). In another exemplary embodiment, the ribs may be constructed using other useful cross sections. The crush box ribs are designed to provide controlled crushing for energy management during a dynamic impact event. In one exemplary embodiment, crush box ribs are integrally formed with the crush boxes during an injection molding process.

As shown in FIG. 6, an exemplary energy absorber may include a support beam 110, which may be molded into the energy absorber and run along all or only a portion of its width, laterally across the top of the upper crush boxes from the left side crush box to the right side crush box. An exemplary support beam may be constructed of a semi-circular forward facing front geometry with one or more rearward extending flange, and may include vertical support ribs positioned at multiple cross-car locations. The support beam provides additional bending strength, and serves to tie various other components of the energy beam together (e.g. clips, snaps, crush boxes). The cross section of the support beam can be varied to accommodate specific customer performance requirements.

As shown in FIG. 7, an exemplary energy absorber may include a lower flange support 134, which may be molded into the energy absorber and run its width, horizontally across the top of the upper crush boxes from the left side crush box to the right side crush box. An exemplary lower flange support may be constructed of a semi-circular forward facing front geometry with one or more rearward extending flange, and may include vertical support ribs positioned at multiple cross-car locations. The lower flange support provides additional bending strength and serves to hide the steel beam that may be positioned rearward of the energy absorber. The lower flange support may further serve to tie various other components of the energy beam together. The cross section of the lower flange support may be varied to accommodate specific customer performance requirements.

Referring to FIGS. 10-21, another exemplary embodiment of a vehicle energy absorber 200 is illustrated for use in a bumper system for a vehicle. Although the energy absorber 200 as shown is intended for use at the back or rear of a vehicle, according to other exemplary embodiments, the energy absorber 200 may be adapted for use at the front of a vehicle. For discussion of FIGS. 10-21, for the purposes of this application, the front of the energy absorber will be defined from the perspective of a person outside and at the rear of a vehicle facing the bumper system, while the rear of the energy absorber will be defined as the direction facing substantially opposite or away from the front. The bottom of the energy absorber will be defined as generally in the direction of the ground, i.e., the surface of the earth, while the top of the energy absorber will be defined as the direction facing substantially opposite or away from the bottom.

According to an exemplary embodiment, the energy absorber 200 having a front or front side 202 and a rear or rear side 204 is intended for use in a bumper system that includes a bumper beam and a fascia (not shown). For example, the energy absorber 200 may be provided in contact with a bumper beam having a B-shaped or other cross-sectional configuration. In one exemplary embodiment, the rear of energy absorber 200 is in contact with the bumper beam and the energy absorber extends horizontally along the entire width of the bumper beam or along only a portion thereof. The energy absorber may be coupled to the fascia using fasteners, hooks, clips, adhesives, or other suitable means, or may instead by sandwiched between the bumper beam and the fascia without the use of any fastening mechanisms.

The energy absorber 200 includes a support beam 210, one or more side crush supports 212, a plurality of crush boxes 214, a plurality of rib arrangements 220, a plurality of wire harness clips 228, and a lower flange support 234.

An exemplary energy absorber may be made from a polymeric material such as polyethylene, thermoplastic olefin, or a combination of polycarbonate and polybutylene terephthalate but is not limited thereto. According to an exemplary embodiment, the energy absorber is manufactured using an injection molding process.

Figure 10:
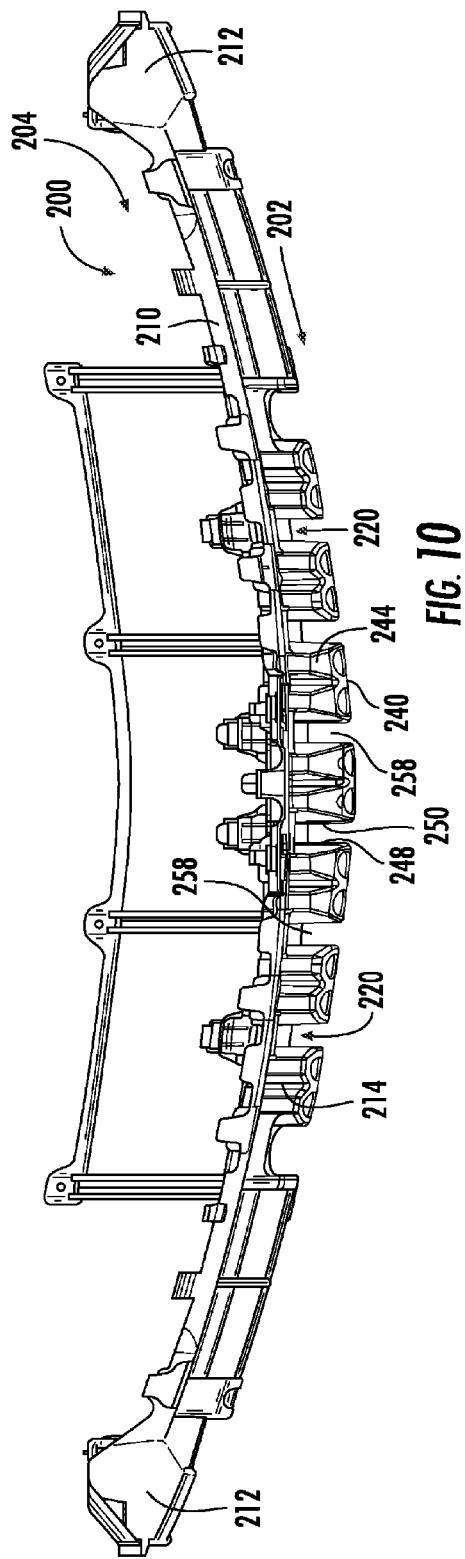
FIG. 10 is a top plan view of a vehicle energy absorber according to another exemplary embodiment.
Figure 11:
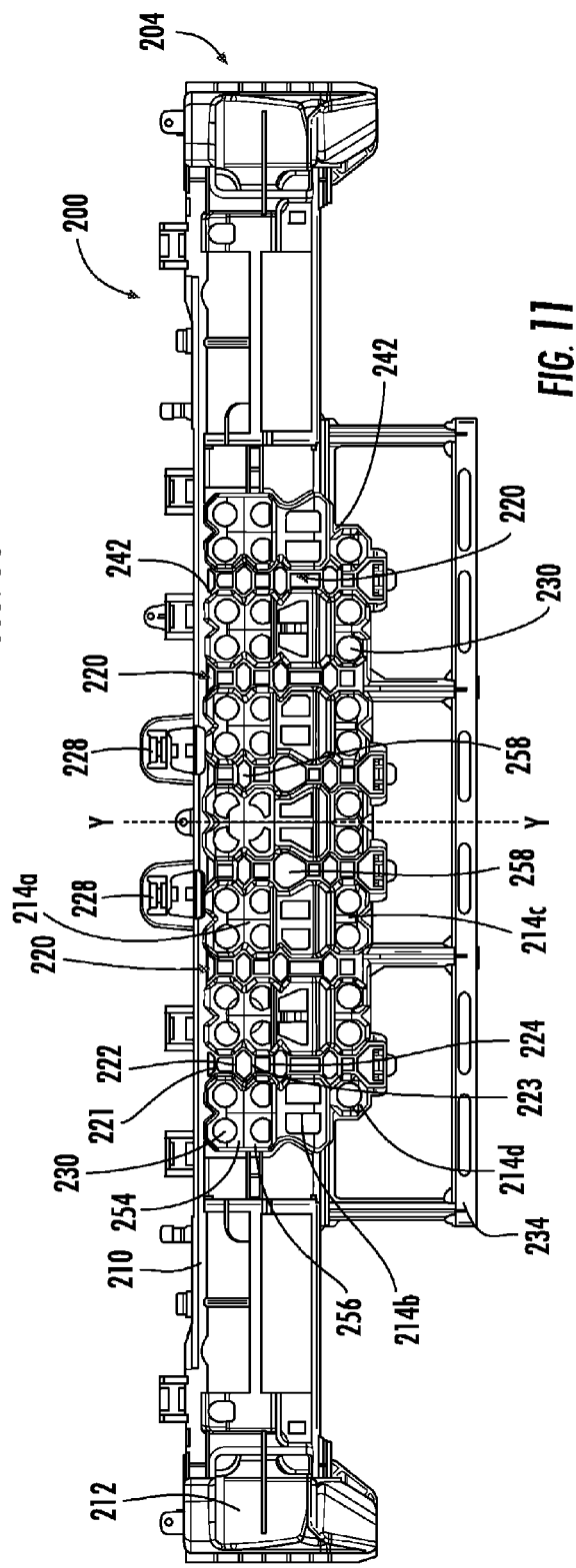
FIG. 11 is a rear plan view of the vehicle energy absorber shown in FIG. 10.

Referring to FIGS. 10-11, the energy absorber 200 includes a plurality of crush boxes 214, which vary in length and shape and are designed to manage or control impact energy by buckling and deflecting during a dynamic impact between the vehicle's bumper and another object.

Figure 12:
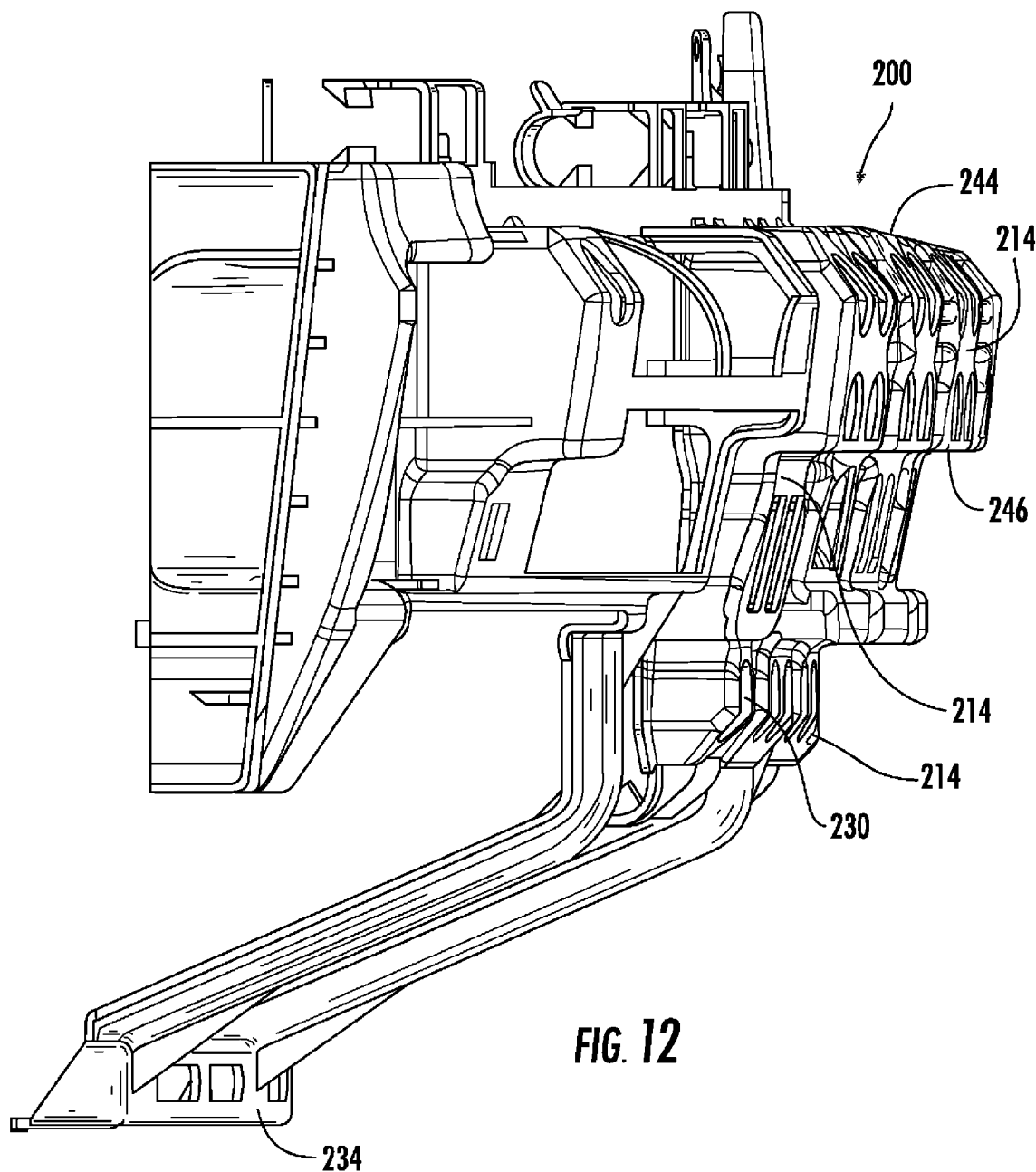
FIG. 12 is a side isometric view of the vehicle energy absorber shown in FIG. 10.

An exemplary crush box 214 may be constructed of multiple polygon shaped protrusions, i.e., polygonal protrusions, linearly aligned and interconnected with one another, which may protrude or extend longitudinally towards the front, i.e. forward, at varying lengths from the rear of the energy absorber (see, e.g., FIG. 12, which illustrates crush boxes formed from polygonal protrusions which extend outward to varying lengths). In one exemplary embodiment, the crush boxes may be constructed having a variety of configurations wherein the shape, size, length, number, and relative position or arrangement of the polygon shaped protrusions are varied. Crush boxes 214a, 214b, 214c, and 214d illustrate a variety of exemplary crush box configurations. It should be understood that the size, shape, and/or configuration of the crush boxes may vary according to other exemplary embodiments.

According to an exemplary embodiment, each crush box 214 is generally a hollow member including a front side 240, a rear side or edge 242, a top 244, a bottom 246, a first side 248, and a second side 250. The top 244, the bottom 246, the first side 248, and the second side 250 of each crush box 214 extend substantially longitudinally forward from the rear side 242 to the front side 240 of the crush box, wherein the front side 240 may include a front surface of the crush box (see, e.g., FIGS. 15-16).

Figure 15:
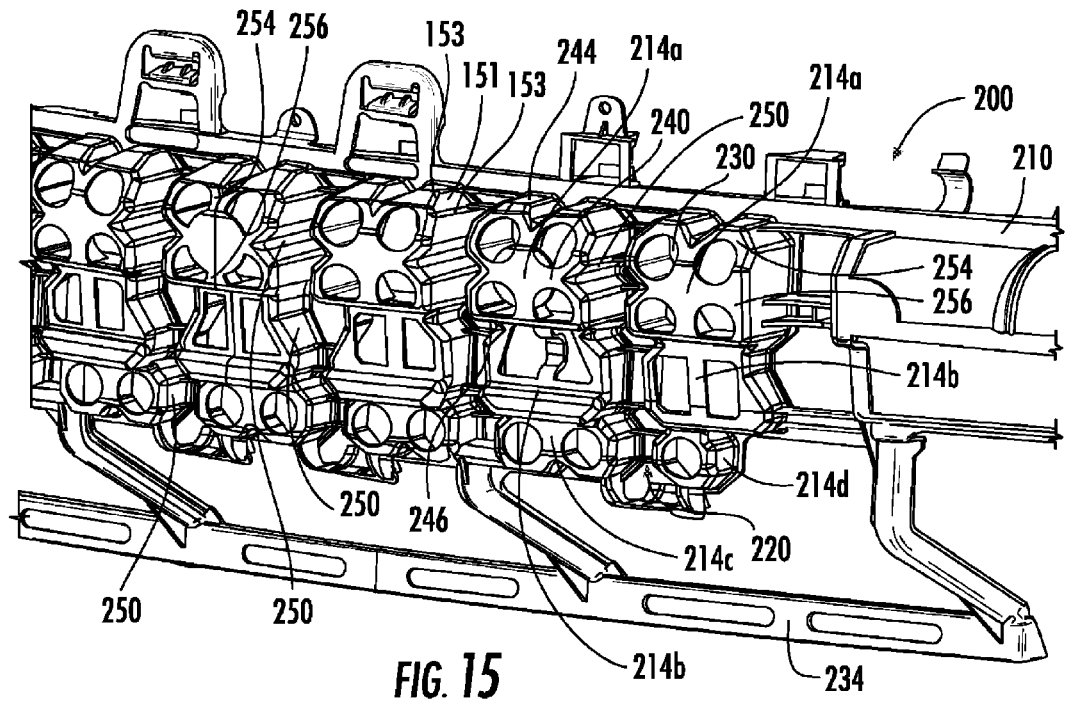
FIG. 15 is a front perspective view of the vehicle energy absorber shown in FIG. 10.

The tops 244, the bottoms 246, the first sides 248 and the second sides 250 of the crush boxes comprise a plurality of longitudinally extending walls 251 extending between the front sides and the rear sides of the crush boxes. In an exemplary embodiment, the walls 251 are generally planar members (see, e.g., FIG. 15 which illustrates the side walls as substantially rectangular and polygonal planar members) that may be substantially vertical, substantially horizontal, or angled. Referring to FIG. 15, a plurality of corners 253 is shown also extending between the front sides and the rear sides of crush boxes. It should be understood to those reading the present disclosure that the corners 253 may be viewed as part of the walls 251 or independent therefrom.

The crush box 214a includes four linearly aligned interconnected octagonal protrusions, that extend longitudinally forward from the rear of the energy. The protrusions form a first or top row 254 and a second or bottom row 256, the top row 254 extending substantially the same length longitudinally forward from the rear of energy absorber 200 as the bottom row 256.

The crush box 214b includes a polygon shaped protrusion extending longitudinally forward from the rear of the energy absorber. In one exemplary embodiment, the crush box 214b may be positioned below, i.e., vertically aligned with, the crush box 214a and may extend a length forward smaller than the length the crush box 214a extends forward. The crush box 214b may further be integrally formed with the crush box 214a during injection molding of the energy absorber. In one exemplary embodiment, the polygon shaped protrusion is a single octagonal protrusion.

The crush box 214c includes two linearly aligned interconnected octagonal protrusions, extending longitudinally from the rear of the energy absorber. In one exemplary embodiment, the crush box 214c may be positioned below the crush box 214b and may extend a shorter length forward than the crush box 214b. In one exemplary embodiment, the crush box 214c may further be integrally formed with the crush box 214b. In another exemplary embodiment, the crush box 214a may be integrally formed with both the crush box 214b and the crush box 214c. In another exemplary embodiment, the crush boxes are integrally formed during an injection molding process.

The crush box 214d includes one octagonal protrusion, extending longitudinally forward from the rear of the energy absorber. In one exemplary embodiment, the crush box 214d may be positioned below the crush box 214b and may extend a length forward shorter than the length the crush box 214b extends forward. In one exemplary embodiment, the crush box 214d may further be integrally formed with the crush box 214b. In another exemplary embodiment, the crush box 214d may be integrally formed with both the crush box 214b and the crush box 214a. In another exemplary embodiment, the crush boxes are integrally formed during an injection molding process.

In other exemplary embodiments, crush boxes of various configurations may be vertically aligned above or below other crush boxes in any useful order. Generally, the crush boxes on top extend a greater length longitudinally forward from the rear of the energy absorber towards the front than crush boxes on the bottom. In one exemplary embodiment, crush boxes may be stepped such that each row of polygon shaped extrusions from the top to the bottom of the crush box extends a progressively smaller distance longitudinally forward from the rear of the energy absorber or crush box. In another exemplary embodiment, crush boxes may be stepped such that each row of polygon shaped extrusions from the top to the bottom of the crush box extends a progressively greater distance longitudinally forward from the rear of the energy absorber or crush box.

According to other exemplary embodiments, crush boxes of various configurations may be vertically aligned above or below other crush boxes in any useful order. Vertically aligned or vertically aligned crush boxes may have corresponding widths or non-corresponding widths.

In an exemplary arrangement of the crush boxes 214 along the width of energy absorber 200 shown in FIGS. 10-11, the crush boxes 214 are shown adjacent to one another, spaced apart along the width of the energy absorber 200 between a first or left side to a second or right side. A plurality of spaces 258 separate the adjacent crush boxes. The spaces 258 are open spaces substantially defined by the first sides 248 and the second sides 250 of the adjacent crush boxes. The spaces may extend longitudinally through the energy absorber, or between the front and the rear of the energy absorber. In another exemplary embodiment, the spaces may separate groupings of crush boxes, e.g. crush boxes that are integrally formed or coupled one on top of the other According to one exemplary embodiment, the crush boxes 214 at the at the center of energy absorber 200 are spaced apart smaller distances, i.e., are closer together, than the crush boxes the right and left ends of the energy absorber. According to another exemplary embodiments, the crush boxes are substantially equidistant from one another. According to another exemplary embodiment, the crush boxes are spaced apart greater distances at the center, i.e., are father apart, than the crush boxes at the lateral ends of the energy absorber.

Figure 16:
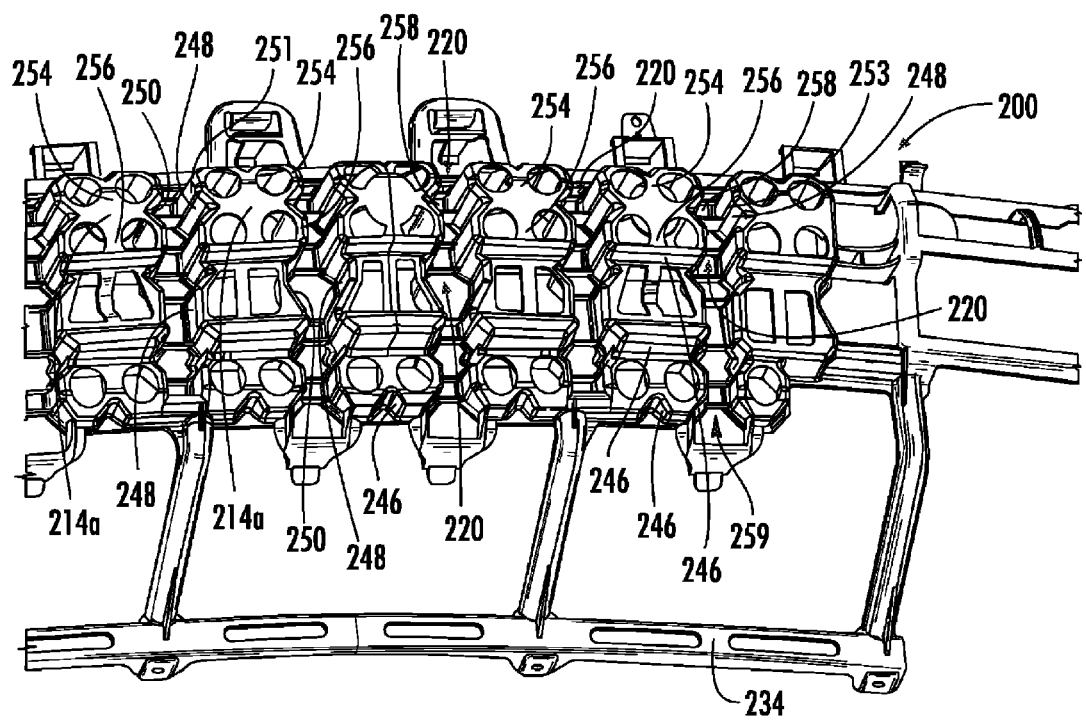
FIG. 16 is another front perspective view of the vehicle energy absorber shown in FIG. 10.

Referring to FIG. 16, the first side 248 of one crush box substantially faces and is spaced a distance from the second side 250 of an adjacent crush boxes. The corresponding first sides and second sides of adjacent crush boxes may include pairs of walls 259 that are substantially parallel to each other and separated a distance apart by the spaces 258. Depending on the configuration of the aligned crush boxes, the substantially parallel walls of the adjacent crush boxes may be substantially opposite and vertically aligned or vertically offset, e.g., the walls are not in the same location relative to the top and bottom of the energy absorber, the walls are different sizes, etc.

Although FIG. 11 illustrates an exemplary embodiment of an energy absorber that is generally symmetric about a center axis (see dashed line Y-Y in FIG. 11), according to other exemplary embodiments, the energy absorber may not be symmetric (e.g., it may include features that are configured to be on one end or the other of the energy absorber).

According to other exemplary embodiments, different crush box designs may be provided and/or an energy absorber may include a different number and/or alignment of crush boxes. For example, other energy absorbers may be constructed to include a different number and/or configuration for the crush boxes such that the design may be customized for a particular customer specification (e.g., as to the width, height, thickness, strength and/or mass of the energy absorber).

As illustrated in FIG. 14, the various crush boxes included in the energy absorber 200 are generally hollow members that are configured to be compressed during a vehicle collision. Ribs or other features (e.g., members, elements, connectors, links, planks, connection members, cross members, crossbars, crosspieces, rungs, protrusions, plates, reinforcements, attachments, couplings, links, parts, rods, bars, poles, beams, supports, spacers, spokes, strips, ties) may provide enhanced rigidity and strength for the crush boxes (see, e.g., FIG. 10).

The crush boxes (e.g. crush box 214) may include one or more apertures or holes 230 to provide for increased stability during molding. For example, where the mold for the energy absorber includes fingers, the energy absorber may be configured to allow the fingers to pass through the apertures during manufacture (see e.g., FIG. 11 illustrating the apertures or holes 230 in the front sides of crush boxes). One advantageous feature of including the apertures or holes 230 in the crush boxes is that such apertures allow energy absorbers to be produced with less mass without compromising the buckling strength of the energy absorber (e.g., since the bulk of the strength for the crush boxes is provided by the lateral walls of the crush boxes). In this manner, the weight of the energy absorber may be reduced without impairing the buckling strength.

Referring to FIG. 11, the crush boxes 214 may be coupled or connected to another crush box using a rib arrangement 220 (e.g., configuration, grouping, conformation, construction, framework, system, design, build, complex, layout, structure, etc.). Rib arrangements 220 may include an individual rib or a plurality of individual ribs that are generally connection or cross members coupling the sides of the adjacent crush boxes. The individual ribs may be constructed as a thin planar member oriented such that it extends forward longitudinally from or near the rear of the energy absorber towards the front of the energy absorber, i.e., in the same direction the polygon shaped protrusions extend relative to the rear of the energy absorber. The thin planar member may be shaped, for example, as a rectangle or a parallelogram. The individual ribs may further be constructed as a rod or a connection or cross member having one or more curved surfaces. In one exemplary embodiment, the ribs are integrally formed between side of adjacent crush boxes during an injection molding process.

In the exemplary embodiment shown, the ribs are substantially perpendicular to the front sides of the crush boxes, although, in other exemplary embodiment, the ribs may also be angled between the walls and angled relative to each other. Generally, the ribs do not extend the entire length from the rear side of the crush box to the front side of the crush box. The ribs may spaced forward a length forward from the rear sides of the adjacent crush boxes coupled by the rib. Alternatively, the ribs may be aligned with or extend in part beyond the rear sides of the adjacent crush boxes coupled by the ribs. When multiple support ribs are provided in a space between the top and bottom of the energy absorber, they are constructed without a front or rear face extending perpendicular to the longitudinally extending ribs.

As shown in FIG. 11, four ribs 221, 222, 223, and 224 form an exemplary rib arrangement 220 that couples adjacent crush boxes together, and generally extend perpendicularly to the walls of the adjacent crush boxes. As shown in FIG. 11, the ribs 221, 222, 223, and 224 couple the crush boxes together at the corners of the crush boxes, although other configurations may be used according to other exemplary embodiments. The ribs extend forward from near the rear sides of adjacent crush boxes along the corners. Alternatively, the corners may extend from the rear of the crush boxes and even from in part beyond the rear of the adjacent crush boxes. The number and positioning of the ribs may also vary according to other exemplary embodiments.

In one exemplary embodiment, the ribs 221, 222, 223 and 224 connect adjacent crush boxes having the same configuration, the front profiles of the ribs forming a plurality of substantially horizontal spaced apart lines. The ribs may be substantially rectangular and extend longitudinally toward the rear of the energy absorber from their front profiles. In other exemplary embodiment, the ribs may connect adjacent crush boxes having different configurations.

Rows of adjacent crush boxes may be coupled by individual ribs or rib structures. Referring to FIG. 16, the top row 254 of a first crush box 214*a* is coupled at second side 250 to the top row 254 of a second crush box 214*a* at first side 248. Further, bottom row of the first crush box 214*a* is coupled at the second side 250 to top row 254 of the second crush box 214*a* at the first side 248. According to the exemplary embodiment shown, one set of vertically aligned crush boxes may be coupled to another adjacent set of vertically aligned crush boxes. In this manner, row structures may be vertically aligned in the spaces 258 between the top and bottom of the energy absorbers 200.

In one exemplary embodiment, the top rows of adjacent crush boxes are coupled at a pair of parallel walls and the bottom rows are coupled at a pair of parallel walls. The ribs may be perpendicular to the parallel walls. Further the ribs may be parallel to each other, forming a ladder-like structure in the open space between the adjacent crush boxes. The parallel walls may also be coupled by rib structures spaced a distance apart in the spaces between the top and bottom of the energy absorber.

One advantageous feature of using ribs to connect adjacent crush boxes is that less material may be used than if the crush boxes were connected by a single wall extending between the crush boxes. The orientation of the ribs is such that they provide enhanced rigidity for the energy absorber by extending longitudinally between the front and rear of the energy absorber between adjacent walls as compared to a simple wall extending between the top and bottom of the energy absorber between adjacent walls.

Also referring to FIG. 11, an exemplary energy absorber 200 includes a side crush support 212 positioned at each outward end of the energy absorber in a cross car direction. An exemplary side crush support 212 is designed so that its face is aligned at an optimal offset angle (e.g., 45 degrees from the longitudinal direction that runs front to rear of the vehicle). This offset angle is intended to improve impact resistance of the energy absorber for non-longitudinal impacts.

According to an exemplary embodiment, a plurality of clips 228, which are molded into the energy absorber to provide for attachment of the vehicle wiring harness, which is typically routed through the energy absorber. The number and size of the clips may be varied according to specific customer requirements. In other exemplary embodiments, any mechanism configured to provide for attachment of the vehicle wiring harness or securing the energy absorber to the fascia or another structure may be used. These mechanisms may be molded into the energy absorber or coupled thereto.

Figure 17:
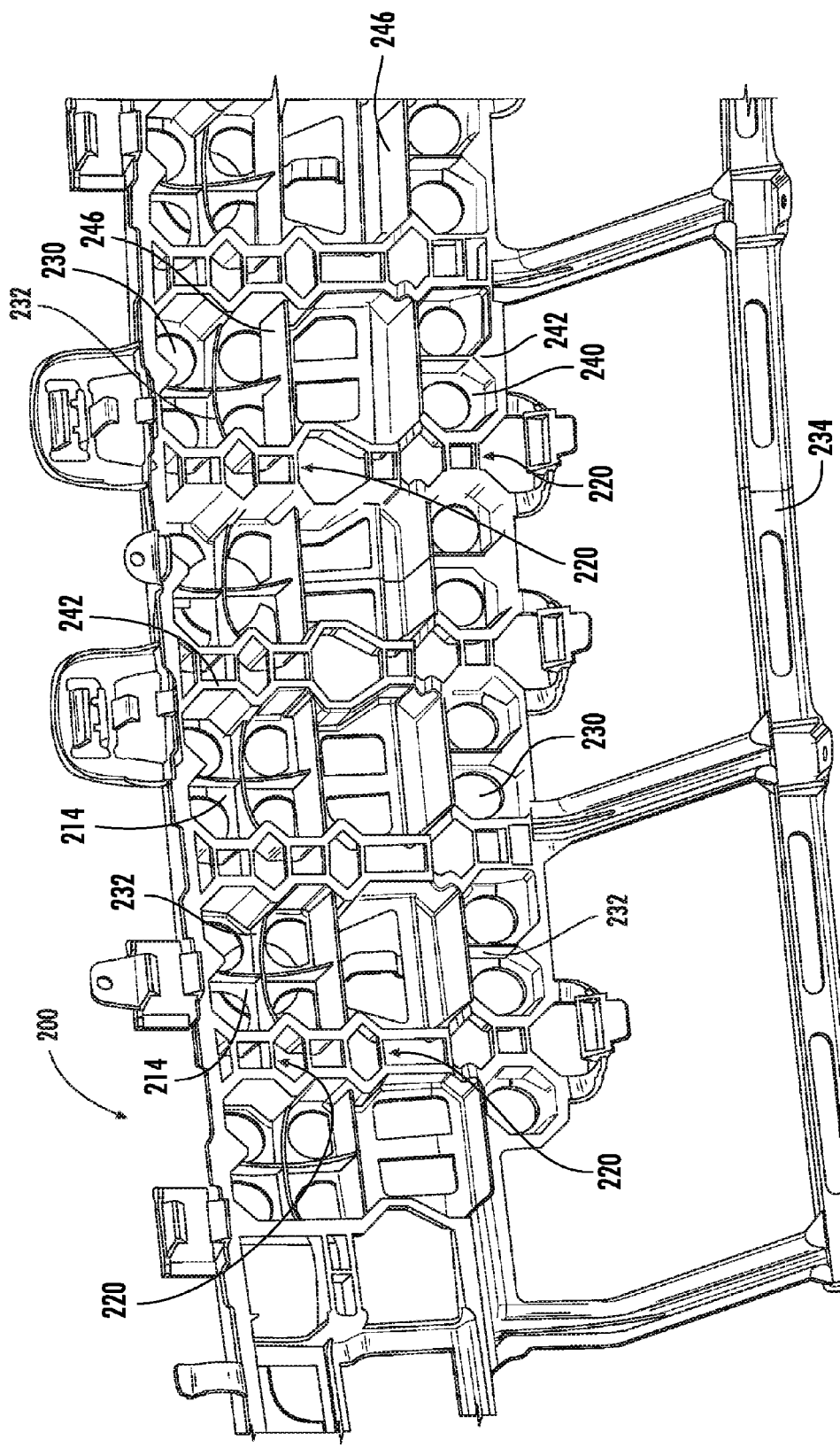
FIG. 17 is a rear perspective view of the vehicle energy absorber shown in FIG. 10.
Figure 18:
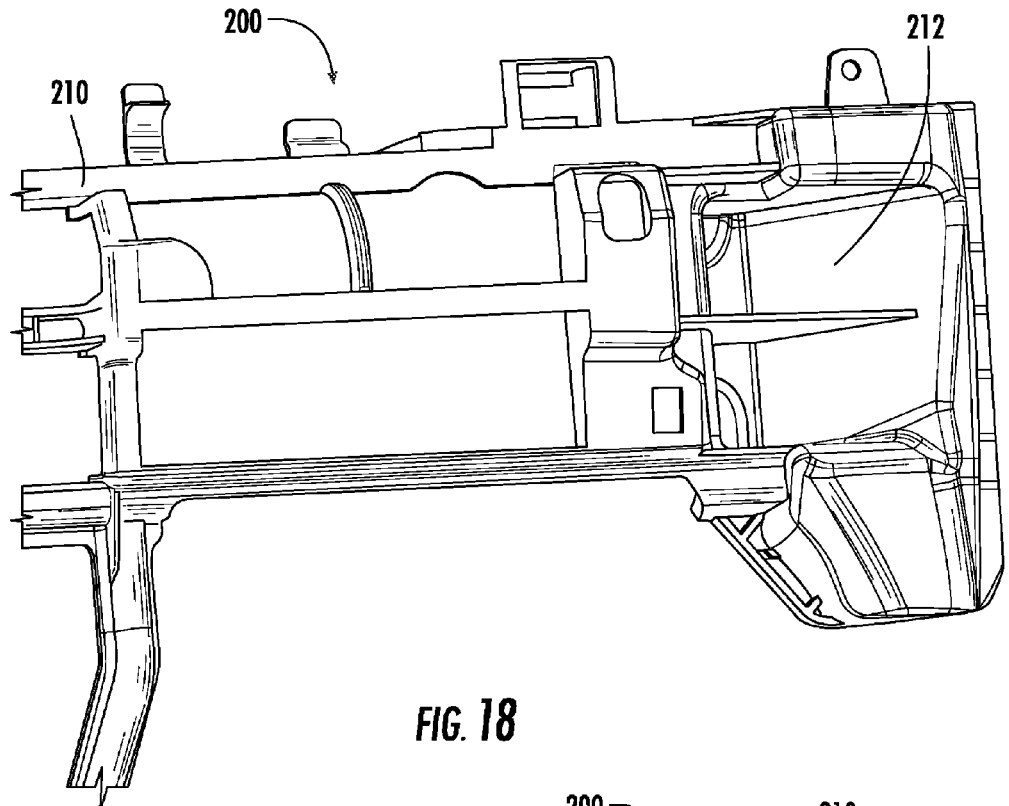
FIG. 18 is a front perspective view of a portion of the vehicle energy absorber shown in FIG. 10.
Figure 19:
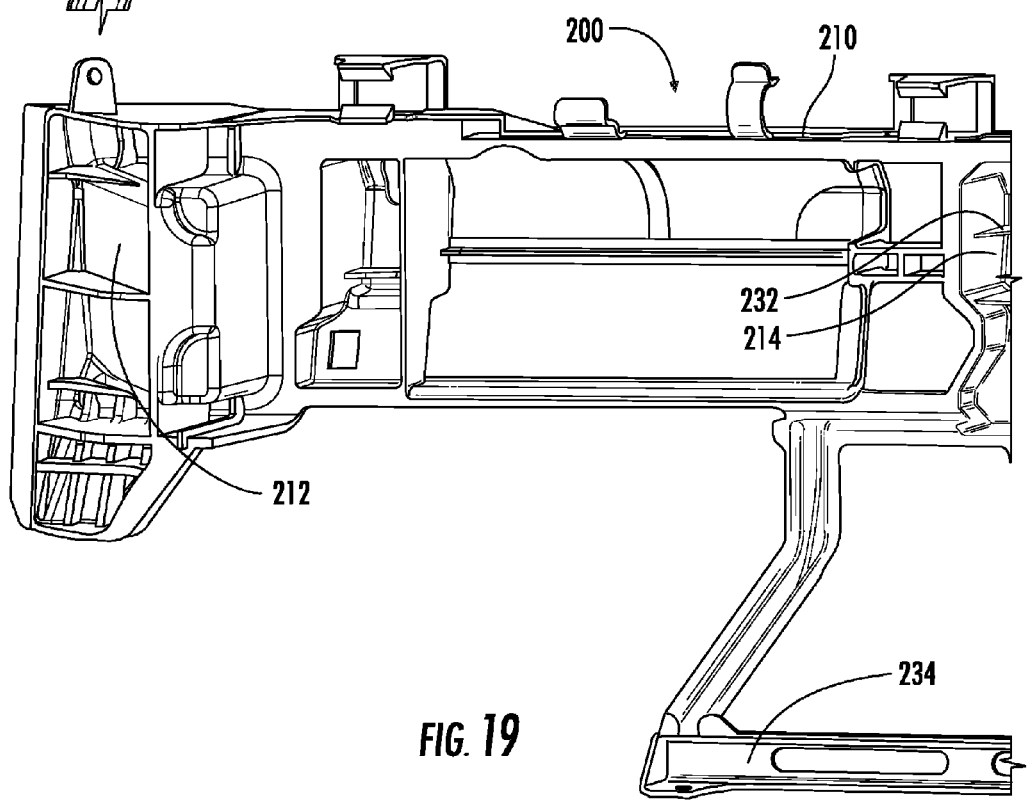
FIG. 19 is a rear perspective view of the portion of the vehicle energy absorber shown in FIG. 18.
Figure 20:
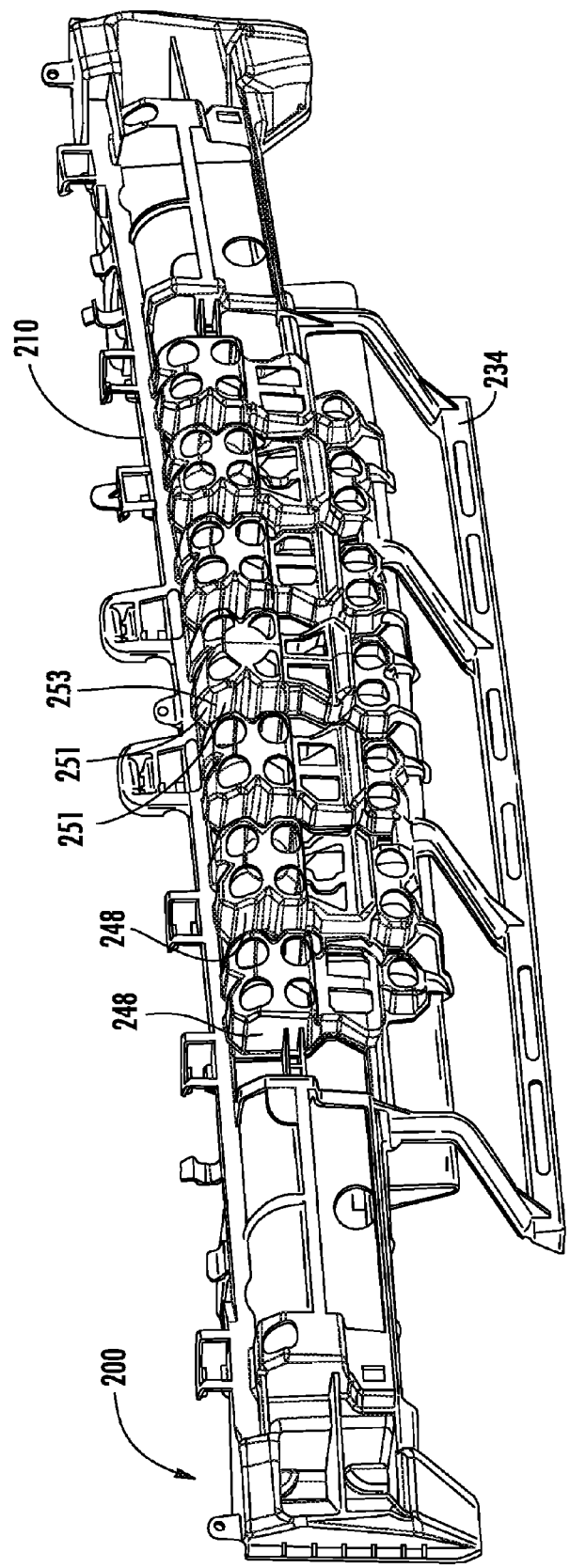
FIG. 20 is a front perspective view of the vehicle energy absorber shown in FIG. 10 coupled to an impact beam of a bumper assembly according to an exemplary embodiment.
Figure 21:
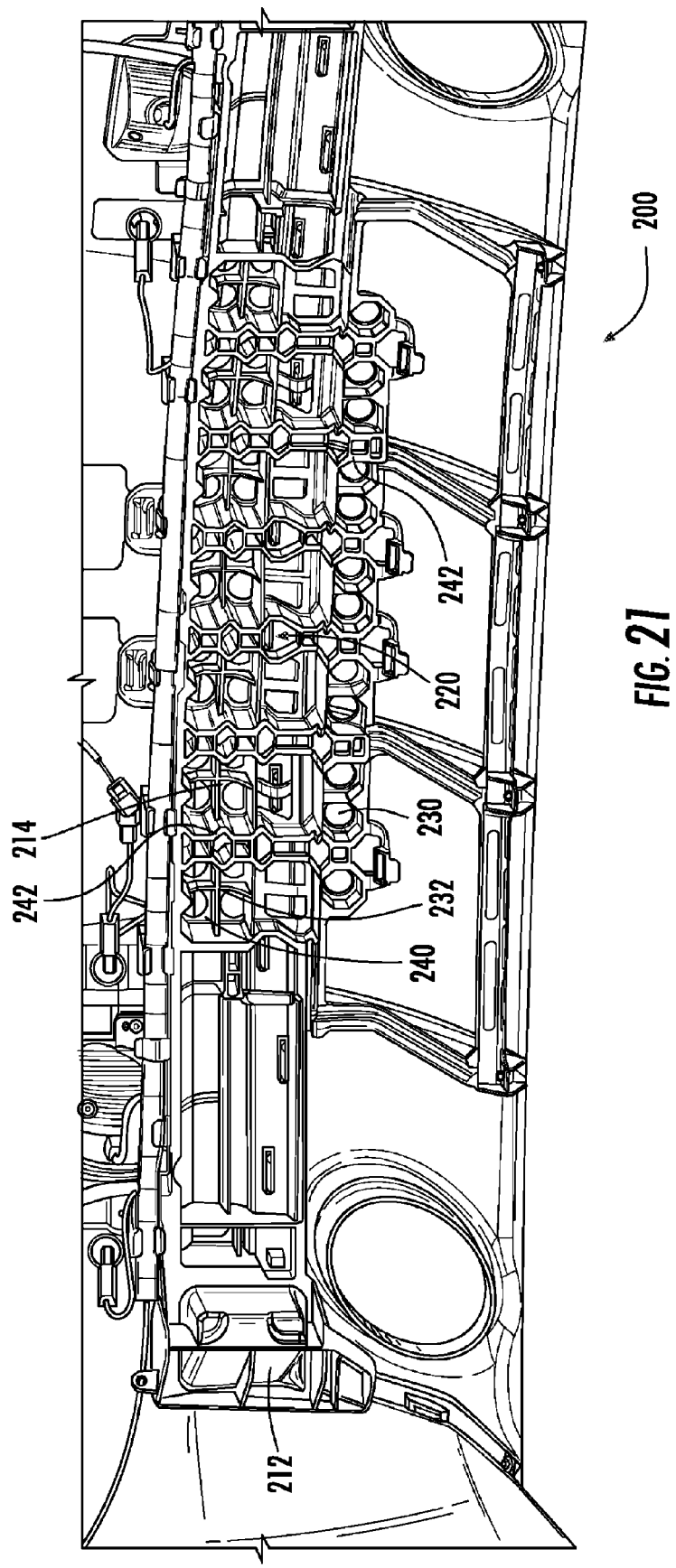
FIG. 21 is a rear perspective view of the vehicle energy absorber shown in FIG. 10 coupled to a fascia component of a bumper assembly according to an exemplary embodiment.

As shown in FIG. 17, an exemplary energy absorber includes a plurality of internal crush box ribs 232. The crush box ribs 232 are located inside the crush boxes 214 and are generally thin planar members that extend longitudinally in the direction of protrusion of the crush box. The crush box ribs 232 may run the entire length of the crush box or any length shorter than the crush box protrusion length. In one exemplary embodiment, the crush box rib may be constructed as single ribs which have horizontal or vertical orientations. In another exemplary embodiment, the internal crush box ribs may be constructed having cross shaped cross sections, incorporating both a rib having a vertical orientation and a rib having a horizontal orientation. In another exemplary embodiment, the ribs may be constructed using other useful cross sections. The crush box ribs are designed to provide controlled crushing for energy management during a dynamic impact event. In one exemplary embodiment, crush box ribs are integrally formed with the crush boxes during an injection molding process.

As shown in FIG. 13, an exemplary energy absorber may include a support beam 210, which may be molded into the energy absorber and run along all or only a portion of its width, laterally across the top of the upper crush boxes from the left side crush box to the right side crush box and across the top of the upper crush boxes. The support beam provides additional bending strength, and serves to tie various other components of the energy beam together (e.g. clips, snaps, crush boxes). Further, in one exemplary embodiment, the support beam may be one of a plurality of support members forming a lattice structure supporting and reinforcing the crush boxes 214 as well as facilitating positioning the crush boxes 214 at desirable positions laterally and vertically along the energy absorber. The cross section of the support beam can be varied to accommodate specific customer performance requirements.

As shown in FIG. 14, an exemplary energy absorber may include a lower flange support 234, which may be molded into the energy absorber and run its width, laterally across the bottom of the upper crush boxes from the left side crush box to the right side crush box from the left side crush box to the right side crush box. In one exemplary embodiment, the lower flange support may extend across the entire width of the bottom of the energy absorber. In other exemplary embodiments, the lower flange may extend across only a portion of the entire width of the bottom of the energy absorber. The lower flange support provides additional bending strength and the cross section can be varied to accommodate specific customer performance requirements.

Those reviewing the present disclosure will appreciate that various configurations for the energy absorber may be used. According to an exemplary embodiment, an energy absorber for a vehicle bumper system includes a rear frame member configured for direct coupling to a vehicle bumper beam. The energy absorber also includes a plurality of crush boxes coupled to the rear frame member, with each of the crush boxes being generally hollow and comprising a rear end, a front end, and a plurality of side walls extending between the rear end and the front end. Each of the plurality of crush boxes are coupled to at least one adjacent crush box by at least one rib oriented in a direction generally along the longitudinal axis of the energy absorber.

Each of the crush boxes may include a plurality of crush box protrusions having a substantially octagon shaped cross-sections. At least one of the plurality of crush boxes may include an aperture in a front surface thereof. At least one baffle or fin may be provided for blocking the flow of air near a portion of the energy absorber. The energy absorber may further include a plurality of members configured to couple the energy absorber to a fascia of the vehicle bumper system.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It should be noted that the orientation of various elements may differ according to other exemplary embodiments, and that such variations are intended to be encompassed by the present disclosure.

It is also important to note that the construction and arrangement of the energy absorber as shown in the various exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed herein. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present invention as defined in the appended claims. The order or sequence of any process or method steps may be varied or re-sequenced according to alternative embodiments. Other substitutions, modifications, changes and omissions may be made in the design, operating conditions and arrangement of the various exemplary embodiments without departing from the scope of the present inventions.

What is claimed is:

1. An energy absorber for a vehicle bumper system, the energy absorber comprising:
   a plurality of crush boxes configured to absorb impact energy, each of the plurality of crush boxes being generally hollow and comprising a front wall and a plurality of side walls integrally formed with and extending from the front wall to a rear of the energy absorber, wherein a first crush box is separated from a second crush box by a distance such that an open space is defined between a side wall of the first crush box and a side wall of the second crush box; and
   a plurality of ribs extending between the side wall of the first crush box and the side wall of the second crush box in the open space to couple the first crush box to the second crush box;
   wherein the plurality of ribs are integrally formed with the first crush box and the second crush box and extend at least partially between the rear of the energy absorber and the front walls of the first and second crush boxes.

2. The energy absorber of claim 1, wherein at least one rib of the plurality of ribs has a generally planar surface that is arranged generally perpendicularly to a plane defined by at least one of the front walls of the first and second crush boxes.

3. The energy absorber of claim 1, wherein at least one of the plurality of ribs is not perpendicular to the side wall of the first crush box and the side wall of the second crush box.

4. The energy absorber of claim 1, wherein at least one rib of the plurality of ribs is spaced along the side wall of the first crush box a distance forward from the rear of the energy absorber.

5. The energy absorber of claim 1, further comprising an aperture extending through the front wall of at least one of the first crush box and the second crush box.

6. The energy absorber of claim 1, wherein at least one rib of the plurality of ribs is coupled to the first crush box at a location where a first side wall of the first crush box meets a second side wall of the first crush box to define a corner of the first crush box.

7. The energy absorber of claim 1, wherein the side wall of the first crush box is generally parallel to the side wall of the second crush box and at least one rib of the plurality of ribs extends substantially perpendicularly to the side wall of the first crush box and the side wall of the second crush box.

8. The energy absorber of claim 1, wherein the first crush box and the second crush box each comprise at least a top row of linearly aligned interconnected polygonal protrusions above a bottom row of linearly aligned interconnected polygonal protrusions.

9. The energy absorber of claim 1, wherein the energy absorber is formed of a polymeric material.

10. The energy absorber of claim 9, wherein the polymeric material is selected from the group consisting of polyethylene, thermoplastic olefin, and a combination of polycarbonate and polybutylene terephthalate.

11. An energy absorber configured for use with a vehicle bumper beam, comprising:
a first generally hollow crush box and a second generally hollow crush box each extending from a rear of the energy absorber to a location forward of the rear of the energy absorber, wherein the first crush box is separated from the second crush box by an open space extending through the energy absorber; and
a plurality of generally planar connection members extending across the open space to couple the first crush box to the second crush box, the plurality of connection members extending along sidewalls of the first crush box and the second crush box forward from a location near the rear of the energy absorber;
wherein the plurality of connection members are spaced apart from each other so that at least one open space is defined between the plurality of connection members.

12. The energy absorber of claim 11, wherein each of the connection members of the plurality of connection members is substantially rectangular.

13. The energy absorber of claim 11, wherein the plurality of connection members comprise a first connection member that is generally parallel to a second connection member.

14. The energy absorber of claim 13, the plurality of connection members comprise a third connection member that is not parallel to the first connection member or the second connection member.

15. The energy absorber of claim 11, wherein the plurality of connection members comprises at least a first rib, a second rib, and a third rib forming a first rib arrangement, the first rib parallel to the third rib and the second rib inclined relative to the first rib and the third rib to form a Z-shape when viewed from a front of the energy absorber.

16. The energy absorber of claim 15, further comprising a second rib arrangement forming a Z-shape, the second rib arrangement coupling the first and second crush box and located below the first rib arrangement in the open space.

17. An energy absorber configured to contact a bumper beam, comprising:
a first crush box comprising a first row and a second row of linearly aligned interconnected polygonal protrusions extending substantially forward from a rear of the energy absorber;
a second crush box spaced a distance from the first crush box comprising a first row and a second row of linearly aligned interconnected polygonal protrusions extending substantially forward from the rear of the energy absorber; and
a first rib arrangement coupling the first row of the first crush box and the first row of the second crush box at a first pair of walls that are substantially parallel to each other and spaced a distance apart, wherein a first rib of the rib arrangement is substantially perpendicular to the first pair of walls and extends a length forward from near the rear of the energy absorber.

18. The energy absorber of claim 17, wherein the polygonal protrusions of the first crush box and the second crush box are octagonal protrusions.

19. The energy absorber of claim 17, wherein the first row of the first crush box extends a greater length forward than the second row of the first crush box, and the first row of the second crush box extends a greater length forward than the second row of the second crush box.

20. The energy absorber of claim 17, further comprising second rib arrangement coupling the second row of the first crush box and the second row of the second crush box at a second pair of walls that are substantially parallel to each other and spaced a distance apart, wherein a first rib of the second rib arrangement is substantially perpendicular to the second pair of walls and extends a length forward from near the rear of the energy absorber.

21. An energy absorber for a vehicle bumper system, the energy absorber comprising:
a plurality of crush boxes configured to absorb impact energy, each of the plurality of crush boxes being generally hollow and comprising a front wall and a plurality of side walls integrally formed with and extending from the front wall to a rear of the energy absorber, wherein a first crush box is separated from a second crush box by a distance such that an open space is defined between a side wall of the first crush box and a side wall of the second crush box;
at least one rib extending between the side wall of the first crush box and the side wall of the second crush box in the open space to couple the first crush box to the second crush box; and
an aperture extending through the front wall of at least one of the first crush box and the second crush box,
wherein the at least one rib is integrally formed with the first crush box and the second crush box and extends at least partially between the rear of the energy absorber and the front walls of the first and second crush boxes.

22. An energy absorber for a vehicle bumper system, the energy absorber comprising:
a plurality of crush boxes configured to absorb impact energy, each of the plurality of crush boxes being generally hollow and comprising a front wall and a plurality of side walls integrally formed with and extending from the front wall to a rear of the energy absorber, wherein a first crush box is separated from a second crush box by a distance such that an open space is defined between a side wall of the first crush box and a side wall of the second crush box; and at least one rib extending between the side wall of the first crush box and the side wall of the second crush box in the open space to couple the first crush box to the second crush box;

wherein the at least one rib is integrally formed with the first crush box and the second crush box and extends at least partially between the rear of the energy absorber and the front walls of the first and second crush boxes, wherein the first crush box and the second crush box each comprise at least a top row of linearly aligned interconnected polygonal protrusions above a bottom row of linearly aligned interconnected polygonal protrusions.

* * * * *